(12) United States Patent
Hosseinabadi et al.

(10) Patent No.: US 12,092,544 B2
(45) Date of Patent: Sep. 17, 2024

(54) OPTICAL FORCE SENSORS

(71) Applicant: THE UNIVERSITY OF BRITISH COLUMBIA, Vancouver (CA)

(72) Inventors: Amir Hossein Hadi Hosseinabadi, Vancouver (CA); Septimiu E. Salcudean, Vancouver (CA)

(73) Assignee: The University of British Columbia, Vancouver (CA)

( * ) Notice: Subject to any disclaimer, the term of this patent is extended or adjusted under 35 U.S.C. 154(b) by 647 days.

(21) Appl. No.: 17/274,745

(22) PCT Filed: Sep. 10, 2019

(86) PCT No.: PCT/CA2019/051276
§ 371 (c)(1),
(2) Date: Mar. 9, 2021

(87) PCT Pub. No.: WO2020/051693
PCT Pub. Date: Mar. 19, 2020

(65) Prior Publication Data
US 2022/0099510 A1 Mar. 31, 2022

Related U.S. Application Data

(60) Provisional application No. 62/834,357, filed on Apr. 15, 2019, provisional application No. 62/824,312, (Continued)

(51) Int. Cl.
*G01L 5/166* (2020.01)
*G01L 25/00* (2006.01)

(52) U.S. Cl.
CPC ............ *G01L 5/166* (2013.01); *G01L 25/00* (2013.01)

(58) Field of Classification Search
CPC . G01L 5/166; G01L 25/00; G01L 1/24; G01L 1/241; G01L 1/2231; G01G 23/361; Y10S 177/06; G01B 11/16
See application file for complete search history.

(56) References Cited

U.S. PATENT DOCUMENTS

| 5,365,059 A | * | 11/1994 | Savage | G01B 11/16 73/800 |
| 5,388,452 A | | 2/1995 | Harp et al. | |
| | | | (Continued) | |

FOREIGN PATENT DOCUMENTS

| EP | 810426 B1 | 4/2000 | |
| EP | 1784614 B1 | * 10/2020 | B64C 25/00 |
| KR | 101337916 B1 | 12/2013 | |

OTHER PUBLICATIONS

"Customizable Optical Force Sensor for Fast Prototyping and Cost-Effective Applications", Diez et al., Sensors (Basel). Feb. 2018; 18(2): 493.(2018).*

*Primary Examiner* — Mohamed K Amara
(74) *Attorney, Agent, or Firm* — Todd A. Rattray; Oyen Wiggs Green & Mutala LLP

(57) ABSTRACT

Apparatus for measuring forces on a load-carrying element comprises optical sensors mounted to the load-carrying element. Each optical sensor includes a light source, a photosensor and an opaque mask positioned in a light path between the light source and the photosensor. The mask has a window that is movable relative to the photosensor and is located such that light from the light source that passes through the window forms an illuminated region on the photosensor. Each of the optical sensors has a first part which includes the light source and the photosensor that is coupled to the load-carrying element at a first location and (Continued)

a second part that includes the mask that is attached to the load-carrying element at a second location spaced apart from the first location.

20 Claims, 25 Drawing Sheets

Related U.S. Application Data filed on Mar. 27, 2019, provisional application No. 62/728,933, filed on Sep. 10, 2018.

(56) References Cited

U.S. PATENT DOCUMENTS

| | | | |
|---|---|---|---|
| 5,636,137 A | 6/1997 | Hazelden | |
| 5,844,146 A * | 12/1998 | Murray | G01L 5/166 |
| | | | 73/862.041 |
| 5,880,461 A | 3/1999 | Spear | |
| 5,923,418 A | 7/1999 | Clark et al. | |
| 7,057,154 B2 | 6/2006 | Kitamura et al. | |
| 7,122,818 B2 | 10/2006 | Kitamura et al. | |
| 7,220,958 B2 | 5/2007 | Kitamura et al. | |
| 7,289,228 B2 | 10/2007 | Kitamura et al. | |
| 7,322,250 B1 * | 1/2008 | Discenzo | G01L 3/12 |
| | | | 73/800 |
| 7,491,957 B2 | 2/2009 | Kitamura et al. | |
| 8,767,219 B2 | 7/2014 | Rutten | |
| 8,780,335 B2 * | 7/2014 | Van Steenberge | G01L 1/24 |
| | | | 356/32 |
| 8,833,183 B2 * | 9/2014 | Blessum | E21B 47/007 |
| | | | 73/862.624 |
| 10,060,807 B2 * | 8/2018 | Blessum | E21B 7/022 |
| 2005/0051714 A1 | 3/2005 | Kitamura et al. | |
| 2007/0188742 A1 * | 8/2007 | Gunsaulis | E21B 7/046 |
| | | | 356/138 |
| 2007/0284512 A1 | 12/2007 | Tanabe et al. | |
| 2014/0260676 A1 | 9/2014 | Janik et al. | |
| 2017/0023421 A1 * | 1/2017 | Blessum | G01L 1/24 |
| 2017/0241254 A1 * | 8/2017 | Jung | E21B 10/00 |
| 2018/0136058 A1 * | 5/2018 | Singer | G01L 3/12 |
| 2022/0099510 A1 * | 3/2022 | Hosseinabadi | G01L 5/166 |

* cited by examiner

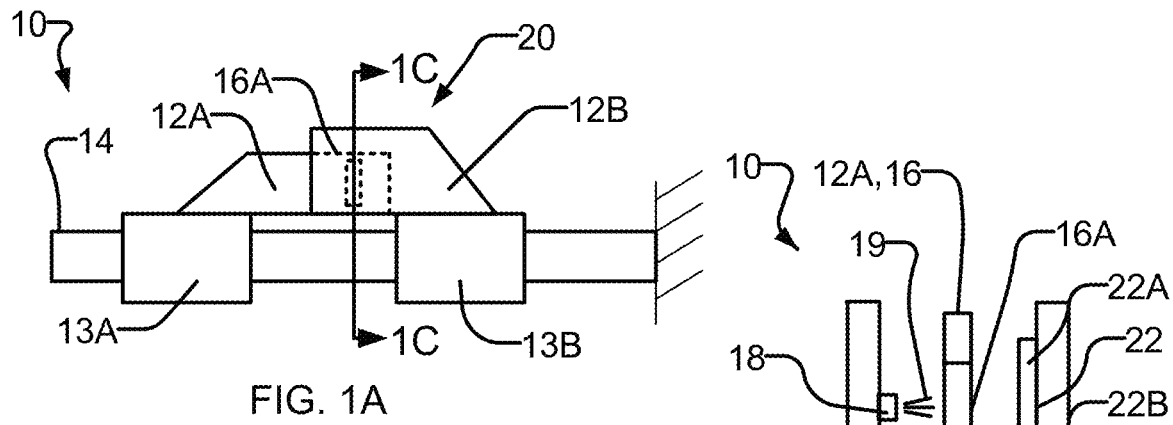
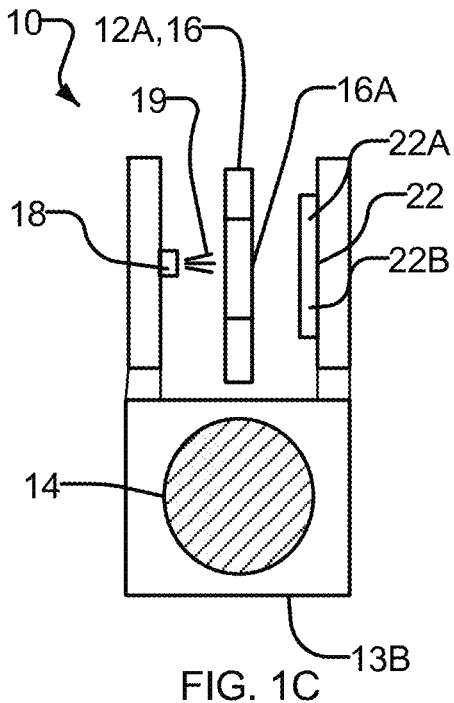
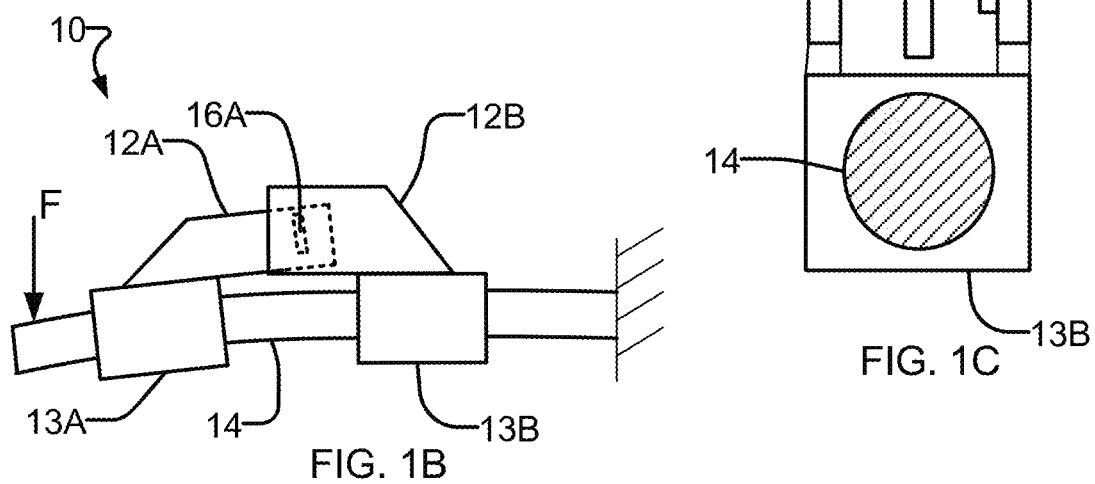
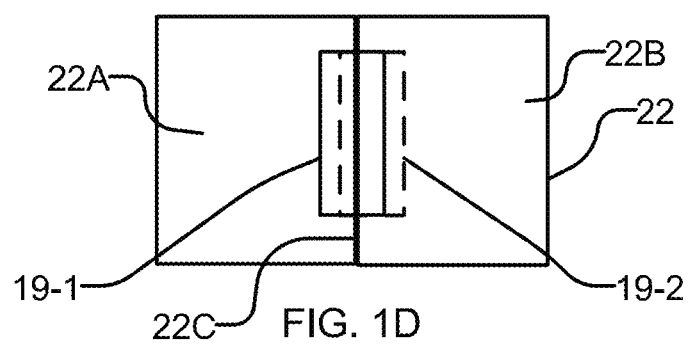
FIG. 1A
FIG. 1B
FIG. 1C
FIG. 1D

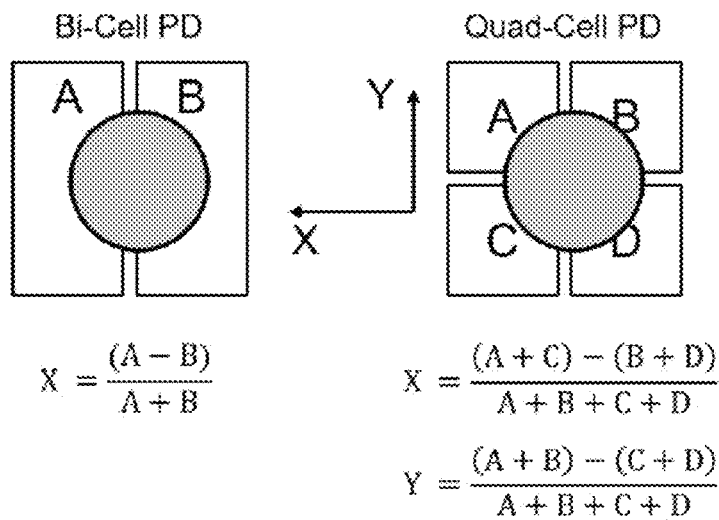
FIG. 2A     FIG. 2B
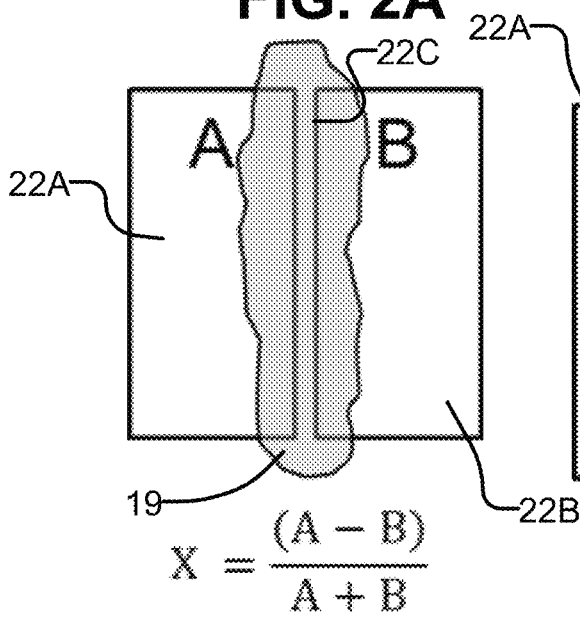 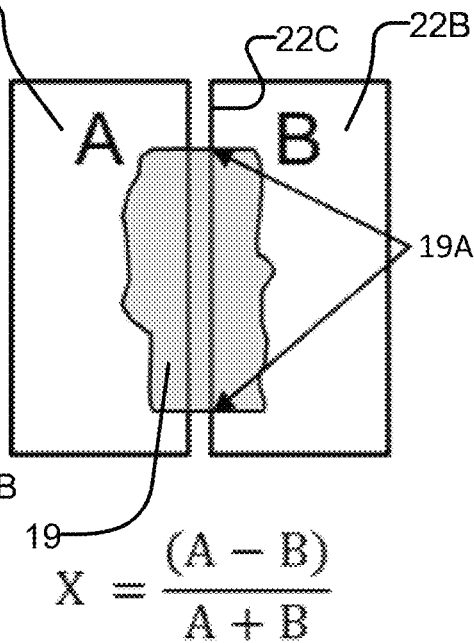
FIG. 2C     FIG. 2D

$$X = \frac{(A+C)-(B+D)}{A+B+C+D}$$

$$Y = \frac{(A+B)-(C+D)}{A+B+C+D}$$

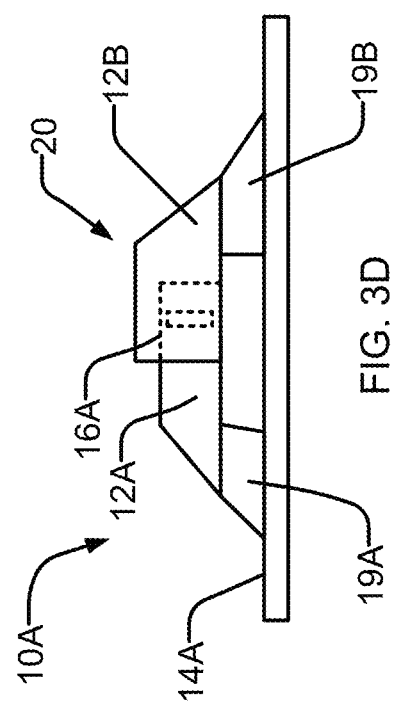

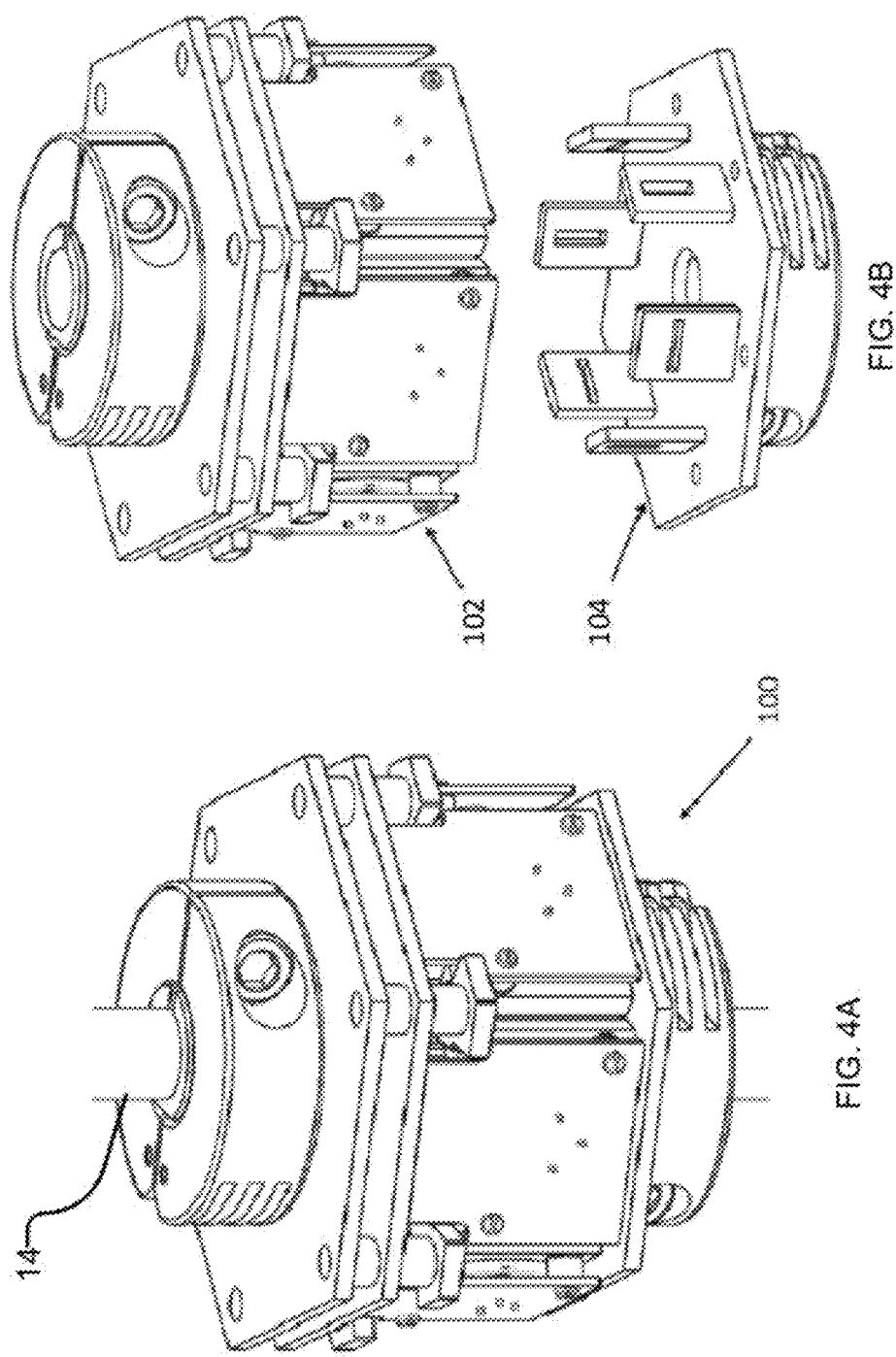

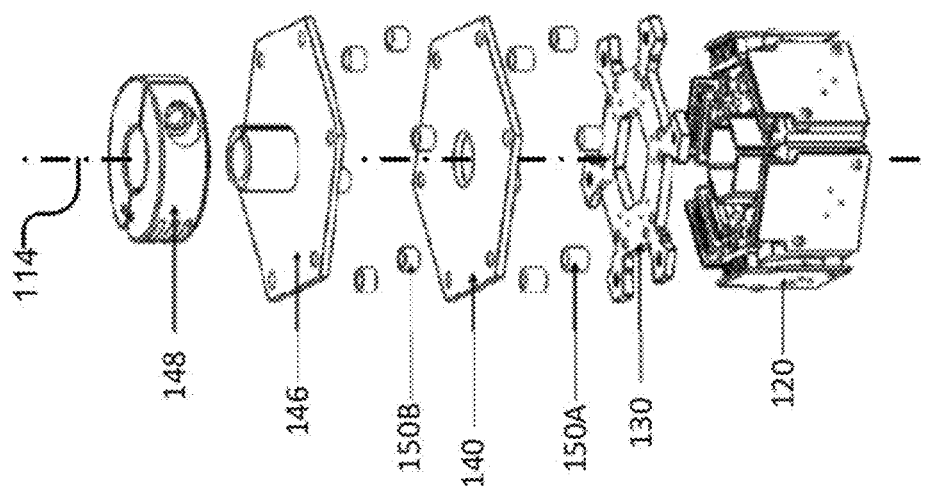

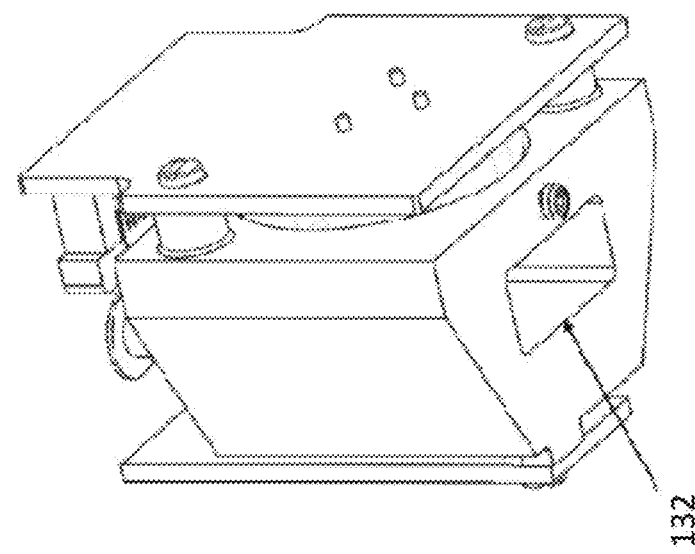
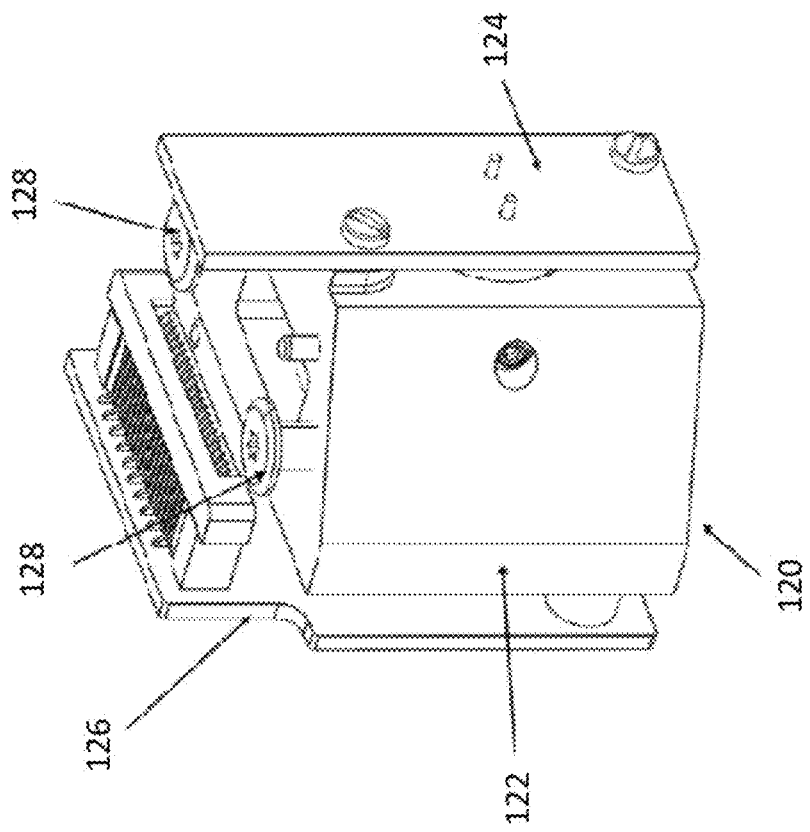
FIG. 7A
FIG. 7B

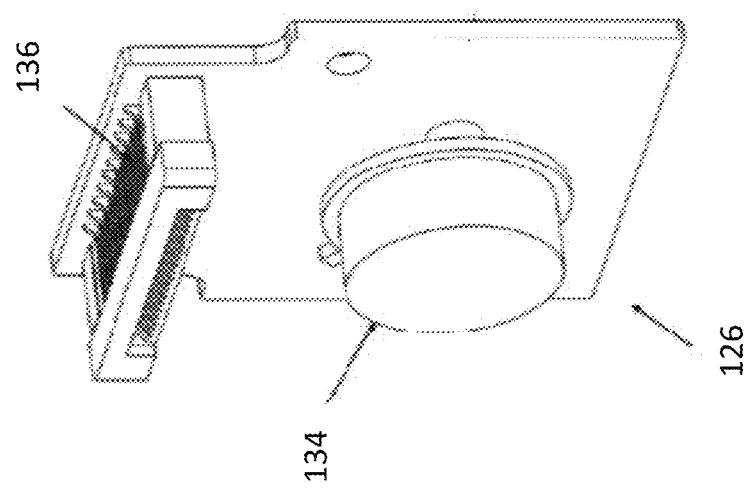

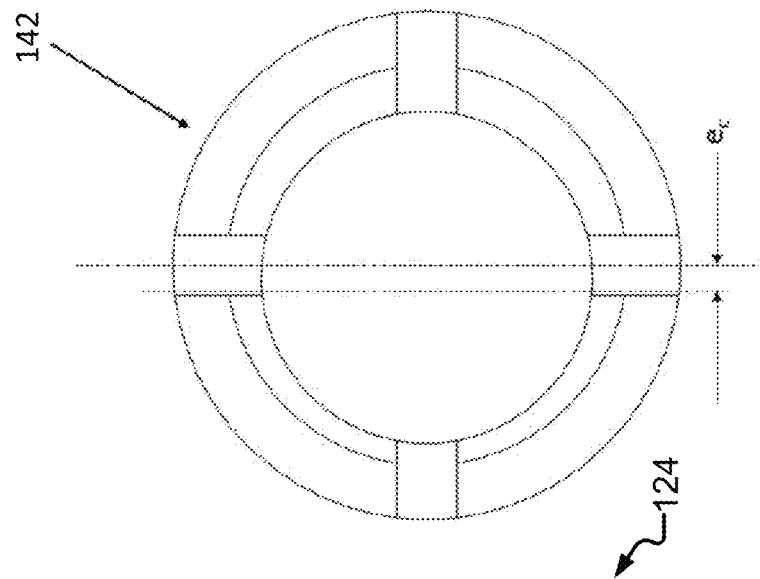
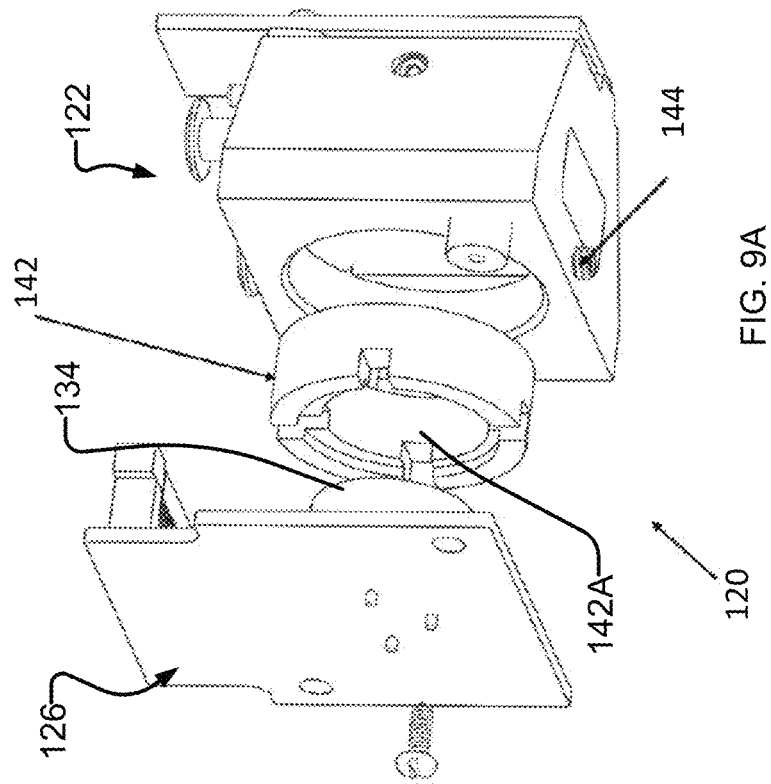
FIG. 9A
FIG. 9B

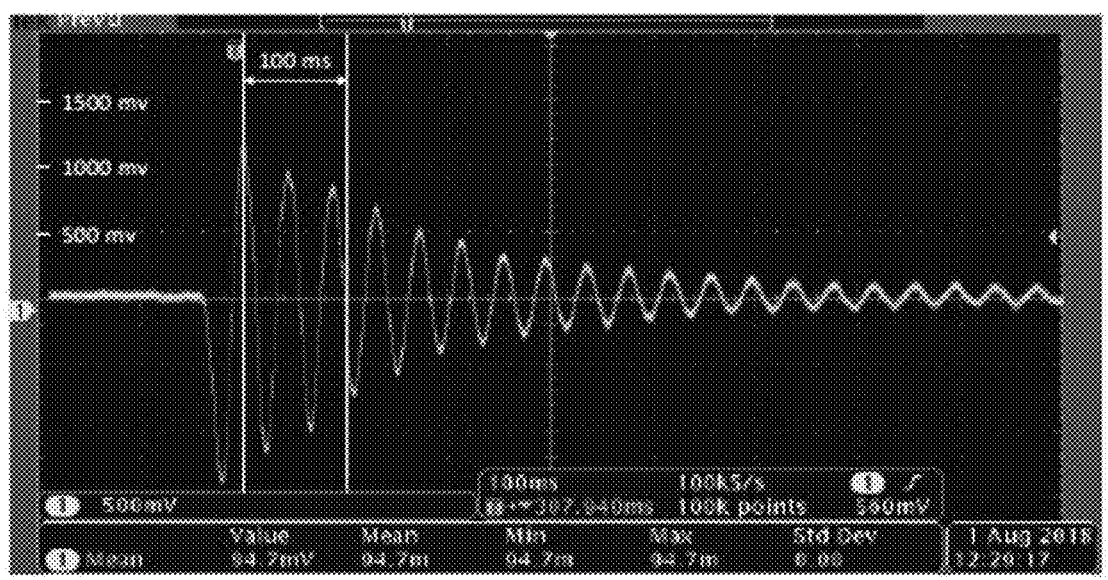
(a) $V_{IA}$ readings in the Oscilloscope - Tektronix MSO 3014
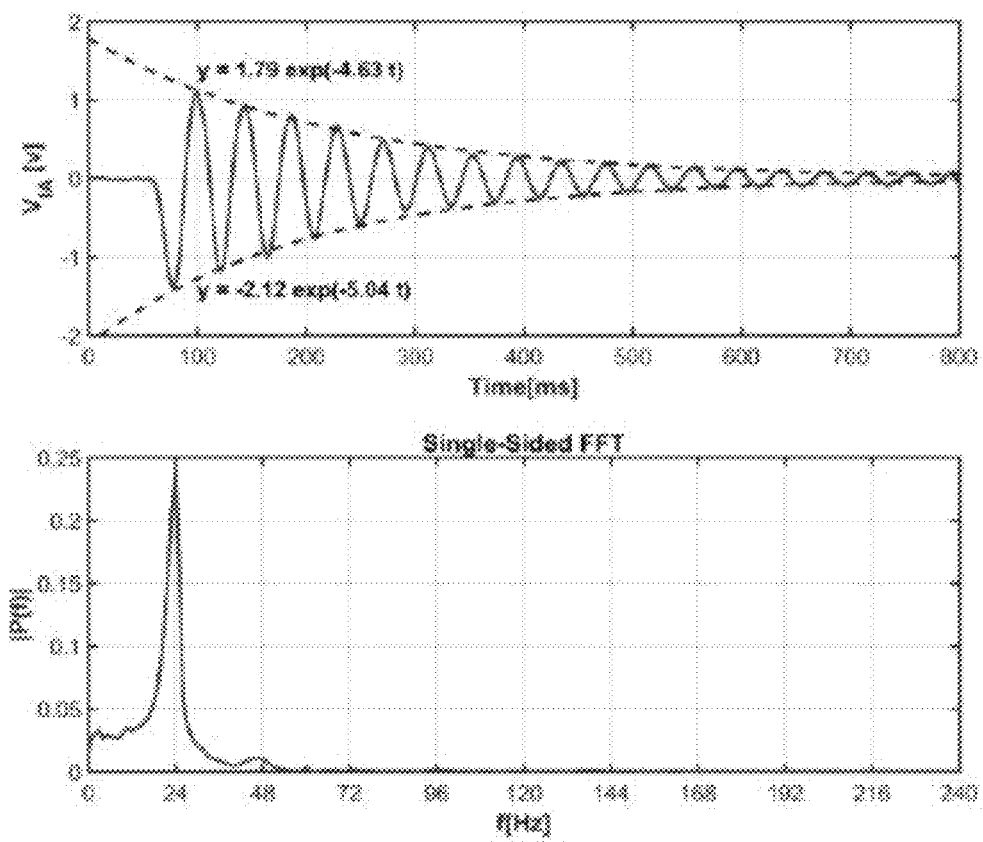
(b) Processed data to identify the modal parameters
FIG. 20

OPTICAL FORCE SENSORS

CROSS-REFERENCE TO RELATED APPLICATIONS

This application claims priority from U.S. application No. 62/728,933 filed 10 Sep. 2018, U.S. application No. 62/824,312 filed 27 Mar. 2019, and U.S. application No. 62/834,357 filed 15 Apr. 2019. For purposes of the United States, this application claims the benefit under 35 U.S.C. § 119 of U.S. application No. 62/728,933 filed 10 Sep. 2018, U.S. application No. 62/824,312 filed 27 Mar. 2019, and U.S. application No. 62/834,357 filed 15 Apr. 2019, all of which are hereby incorporated herein by reference for all purposes.

FIELD

This invention relates to force sensing.

BACKGROUND

This invention relates to sensing forces. It is desirable to measure forces on structures in an extremely wide variety of applications. For example, it may be desirable to measure a force on a tool, surgical instrument, robotic arm, structure, or the like. Such a measure of force may be used to provide haptic feedback, to control applied force, to monitor structures or devices, or for any of a wide variety of other purposes.

There remains a need for new force measurement apparatus and methods.

SUMMARY

This invention has a number of aspects including, without limitation:
- Apparatus for measuring forces;
- Methods for measuring forces;
- 6 DOF force measurement apparatus;
- Methods for checking force measurements using redundant displacement sensors;
- Systems for retrofitting an existing robot, machine or structure to measure forces on the robot, machine or structure;
- Circuits for processing signals from photosensors;
- Methods for applying offsets to signals represented by photocurrents;
- All combinations of any or all of the above.

One aspect of the invention provides an apparatus for measuring forces on a load-carrying element. The apparatus comprises a plurality of optical sensors mounted to the load-carrying element. Each of the optical sensors comprises a light source, a photosensor, and an opaque mask positioned in a light path between the light source and the photosensor. The photosensor comprises first and second light sensitive elements separated by a boundary. The mask has a window that is movable relative to the photosensor and located such that light from the light source that passes through the window forms an illuminated region of the photosensor. The illuminated region includes at least part of the boundary and parts of each of the first and second light sensitive elements. For each of the plurality of the optical sensors, a first part of the optical sensor comprising the light source and photosensor is coupled to the load-carrying element at a first location. A second part of the optical sensor comprising the mask is attached to the load-carrying element at a second location spaced apart from the first location. A part of the load-carrying element extending between the first location and the second location undergoes deformation as a result of the forces. The boundaries between the first and second light sensitive elements of the photosensors of different ones of the optical sensors are oriented in different directions relative to an axis of the load-carrying element.

In some embodiments, the plurality of optical sensors includes at least six of the optical sensors. In some embodiments, the plurality of optical sensors includes at least eight of the optical sensors. In some embodiments, the light sensitive elements comprise photodiodes. In some embodiments, the optical sensors are arranged in a ring extending around the load-carrying element.

In some embodiments, for a first group of optical sensors the boundary between the first and second light sensitive elements of the photosensor is oriented generally parallel to the axis of the load-carrying element and for a second group of the optical sensors the boundary between the first and light sensitive elements of the photosensor is oriented generally transverse to the axis of the load-carrying element.

In some embodiments, for a first group of optical sensors the boundary between the first and second light sensitive elements of the photosensor is oriented in a first direction relative to the axis of the load-carrying elements and for a second group of the optical sensors the boundary between the first and second light sensitive elements of the photosensor is oriented in a second direction relative to the axis of the load-carrying element. The first and second directions are mutually perpendicular. In some embodiments, the optical sensors are circumferentially spaced apart around the load-carrying element and the optical sensors of the first group alternate with (e.g. are interleaved with) the optical sensors of the second group when travelling circumferentially around the load-carrying element.

In some embodiments, the optical sensors of the first and/or second groups of the plurality of optical sensors are equally angularly spaced apart around the load-carrying element. In some embodiments, for each of the optical sensors, one of the first and second parts of the optical sensor is mounted to a first carrying member that is attached to the load-carrying element and the other one of the first and second parts of the optical sensor is mounted to a second carrying member that is attached to the load-carrying element. The first carrying member may comprise a ring that extends around the load-carrying element.

In some embodiments, one or more of the optical sensors comprises a mechanical adjustment operable to move the first part of the optical sensor relative to the second part of the sensor in a direction that is transverse to the boundary. In some embodiments, one or more of the optical sensors comprises a mechanical adjustment operable to move the first part of the optical sensor relative to the second part of the sensor in a direction that is parallel to a longitudinal axis of the load-carrying element. Such adjustment may be used, for example to accommodate different spacings between the first and second locations.

In some embodiments, the load-carrying element is tubular and the axis of the load-carrying element extends longitudinally relative to the tubular member.

In some embodiments, the apparatus comprises electronic circuits connected to receive, amplify and send to a processor output signals from the plurality of optical sensors. In some embodiments, the electronic circuits are located no more than 8 cm from any of the optical sensors. The electronic circuits may optionally comprise an offset circuit connected to drive an offset current through one of the first and second light sensitive elements, the offset current adding to or subtracting from a current passing through the light sensitive element. The output signal from the optical sensor may comprise magnitudes of electric currents passing through the first and second light sensitive elements and the electronic circuits may comprise transimpedance amplifiers connected to convert the currents passing through the first and second light sensitive elements into corresponding voltages. In some embodiments, the apparatus comprises a difference amplifier having inputs connected to receive the corresponding voltages and an output connected to deliver a signal representing a difference of the corresponding voltages.

In some embodiments, the electronic circuits comprise one or more analog to digital converters connected to digitize the output signals from the plurality of optical sensors. The electronic circuits may comprise one or more programmable gain amplifiers connected to adjust a gain of the output signals input to the analog to digital converters. The electronic circuits may be configured to set gains of the one or more programmable gain amplifiers to maintain levels of the signals input to the one or more analog to digital converters above a desired level and below a level at which the one or more analog to digital converters are saturated. In some embodiments, the apparatus comprises a processor connected to process outputs from the optical sensors to yield forces applied to the load-carrying element. The processor is configured to select one of a plurality of sets of calibration values corresponding to the gains for the one or more programmable gain amplifiers and to apply the selected set of calibration values to process the outputs from the optical sensors to yield the forces applied to the load-carrying element.

In some embodiments, the electronic circuits comprise one or more processing elements configured to process the output signals from the plurality of optical sensors to yield one or more measurements of forces on the load-carrying element. The one or more processing elements may comprise a field programmable gate array (FPGA). In some embodiments, the electronic circuits are configured to process the output signals from the plurality of optical sensors to yield forces and torques on the load-carrying element in 6 degrees of freedom.

In some embodiments, the apparatus comprises a host computer spaced apart from the optical sensors and the host computer is connected to the apparatus by a cable comprising no more than 9 wires. In some embodiments, the cable comprises no more than 4 wires.

In some embodiments, the apparatus comprises a processor connected to process outputs from the optical sensors to yield forces applied to the load-carrying element in three degrees of freedom and moments applied to the load-carrying element in at least one degree of freedom. The processing performed by the processor may comprise multiplying a vector comprising the outputs of the optical sensors by a calibration matrix. In some embodiments, the processing yields forces and moments in six degrees of freedom.

In some embodiments, the apparatus comprises more of the optical sensors than a number of degrees of freedom of the forces and moments determined by processing the outputs of the optical sensors. In such embodiments the processor may be configured to access plural sets of calibration values, each set of calibration values corresponding to a subset of the optical sensors of the apparatus and the processor may be configured to compute plural sets of the forces and moments by processing the outputs of the optical sensors of the plural subsets of the optical sensors using the corresponding set of calibration values.

In some embodiments, the processor is configured to combine the plural sets of the forces and moments to yield and output set of forces and moments. In some embodiments, the processor is configured to compare the forces and moments of the plural sets of forces and moments to generate a value indicating uncertainty in the measured forces and moments.

In some embodiments, the light sources of the optical sensors are controlled to synchronously flash at a low duty cycle.

In some embodiments, the window is dimensioned so that the illuminated region completely covers the boundary between the first and second light sensitive elements. In some embodiments, the window is shaped and dimensioned so that the illuminated region covers a portion of the boundary between the first and second light sensitive elements. Portions of a boundary of the illuminated region that cross the boundary between the first and second light sensitive elements are straight line segments oriented perpendicular to the boundary between the first and second light sensitive elements.

In some embodiments, the first and second light sensitive elements of the photosensor of one or more of the optical sensors are divided into two parts by a second boundary that intersects the boundary. The window may be dimensioned so that the illuminated region covers a portion of the boundary between the first and second light sensitive elements and a portion of the second boundary. In some embodiments, the window is shaped such that portions of a boundary of the illuminated region that cross the boundary between the first and second light sensitive elements are straight line segments oriented perpendicular to the boundary between the first and second light sensitive elements. Portions of the boundary of the illuminated region that cross the second boundary are straight line segments oriented perpendicular to the second boundary.

In some embodiments, the apparatus comprises a low pass filter for filtering the output signals of the optical sensors. In some embodiments, the mask comprises one or more optical elements arranged to steer light from the light source onto the photodetector.

Another aspect of the invention provides a method of calibrating a force sensor. The method comprises applying known forces and torques to the load-carrying element and measuring output signals from the optical sensors. Based on the known forces and torques and the measured output signals, the method comprises computing an inversion matrix that may be applied to transform the output signals from the optical sensors into 6DOF force-torque data.

In some embodiments, the method comprises applying known forces and torques to the load-carrying element and measuring output signals from the optical sensors. For each of the subsets of the optical sensors, based on the known forces and torques and the measured output signals for the optical sensors of the subset of optical sensors, the method further comprises computing an inversion matrix that may be applied to transform the output signals from the optical sensors into force-torque data. The method further comprises storing the inversion matrices.

Another aspect of the invention provides a method for measuring forces and torque on a load-carrying element. The method comprises providing a plurality of optical sensors mounted to the load-carrying element. Each of the optical sensors comprises a light source, a photosensor and an opaque mask positioned in a light path between the light source and the photosensor. The photosensor comprises first and second light sensitive elements separated by a boundary and the mask has a window located such that light from the light source that passes through the window forms an illuminated region on the photosensor. The illuminated region includes at least part of the boundary and parts of each of the first and second light sensitive elements. For each of the plurality of optical sensors, a first part of the optical sensor comprising the light source and the photosensor is coupled to the load-carrying element at a first location. A second part of the optical sensor comprising the mask is attached to the load-carrying element at a second location spaced apart from the first location. A part of the load-carrying element extending between the first location and the second location undergoes deformations as a result of the forces. The boundaries between the first and second light sensitive elements of the photosensors of different ones of the optical sensors are oriented in different directions relative to an axis of the load-carrying element. The method further comprises processing output signals from the light sensitive elements of the plurality of optical sensors to determine measurements of the forces applied to the load-carrying element in at least two directions and at least one moment applied to the load-carrying element.

In some embodiments, the method comprises adjusting a balance between photocurrents of the first and second light sensitive elements by passing an offset current through one of the first and second light sensitive elements. The offset current adds to or subtracts from a current passing through the one of the first and second light sensitive elements. In some embodiments, output signals from the optical sensors comprises magnitudes of electric currents passing through the first and second light sensitive elements and the method comprises converting the current signals to voltage signals.

In some embodiments, for each of the optical sensors, the method comprises subtracting the voltage signal corresponding to the second light sensitive element from the voltage signal corresponding to the first light sensitive element (i.e. determining a DIFFERENCE signal).

In some embodiments, variable gain amplification is applied to the output signals from the optical elements. In such embodiments the amplified output signals of the optical elements may be digitized and gains of the variable gain amplification may be adjusted to maintain levels of the amplified output signals above a threshold level and below a saturation level of the digitizing.

In some embodiments, the method comprises processing the output signals from the optical sensors to yield measurements of the forces applied to the load-carrying element. The processing may comprise selecting one of a plurality of sets of calibration values corresponding to the gains of the variable amplification and applying the selected set of calibration values to process the output signals from the optical sensors to yield the measurements of the forces applied to the load-carrying element.

In some embodiments, the output signals from the plurality of optical sensors are processed to yield one or more measurements of forces on the load-carrying element. Measured forces and torques on the load-carrying element in 6 degrees of freedom may be generated. In some embodiments, processing the output signals comprises multiplying a vector comprising values of the output signals by a calibration matrix.

In some embodiments, the plurality of optical sensors comprises more of the optical sensors than a number of degrees of freedom of the measured forces and moments. In such cases the method may include computing plural sets of the measured forces and moments. Each of the plural sets of measured forces and moments may correspond to a subset of the optical sensors. Computing each of the plural sets of the measured forces and moments can be done using a corresponding one of plural sets of calibration values. Each of the plural sets of the calibration values may correspond to one of the subsets of the optical sensors. The plural sets of the measured forces and moments may be combined to yield an output set of forces and moments.

In some embodiments, the method comprises comparing the measured forces and moments of the plural sets of measured forces and moments to generate a value indicating uncertainty in the measured forces and moments.

In some embodiments, the method comprises operating the light sources of the optical sensors to be turned on at times scheduled for obtaining the output signals from the light sensitive elements of the plurality of optical sensors. The light sources of the optical sensors are operated to be off at other times.

Another aspect of the invention provides an apparatus for measuring forces on a shaft. The apparatus comprises first and second attachments configured to be rigidly attached to the shaft at first and second longitudinal positions along the shaft, the longitudinal positions spaced apart from one another. The apparatus further comprises an optical sensor comprising a light source, a photosensor and an opaque mask positioned in a light path between the light source and the photosensor. The photosensor comprises first and second light sensitive elements separated by a boundary and the mask has a window located such that light from the light source that passes through the window forms an illuminated region on the photosensor. The illuminated region includes at least part of the boundary and parts of each of the first and second light sensitive elements. The light source and photosensor are attached to the first attachment and the mask is attached to the second attachment. One or both of the first and second attachments may comprise a collar having a bore shaped and dimensioned to receive the shaft and equipped with a means for clamping the collar to the shaft so that the collar is rigidly attached to the shaft. For example, the apparatus may comprise first and second clamps configured to clamp first and second collars, respectively to the shaft at the first and second longitudinal positions.

In some embodiments, the photosensor of the optical sensor is oriented such that the boundary is spaced apart from and extends parallel to a longitudinal axis of a portion of the shaft extending between the first and second collars. In some embodiments, the photosensor of the optical sensor is oriented such that the boundary is spaced apart from and extends transversely to a longitudinal axis of a portion of the shaft extending between the first and second collars. In some embodiments, the window is a parallel sided slit. In some embodiments, the window has a shape which provides two straight parallel sides. The window is oriented such that edges of the illuminated region that correspond to the two straight parallel sides of the window perpendicularly intersect the boundary.

In some embodiments, the optical sensor is one of a plurality of optical sensors that are angularly spaced apart from one another around the shaft. In some embodiments, for each of a first group of two or more of the plurality of optical sensors, the photosensor is oriented such that the boundary is spaced apart from and extends parallel to a longitudinal axis of a portion of the shaft extending between the first and second collars. In some embodiments, for each of a second group of two or more of the plurality of optical sensors, the photosensor is oriented such that the boundary is spaced apart from and extends transversely to a longitudinal axis of a portion of the shaft extending between the first and second collars.

In some embodiments, the first and second collars are attached at opposing ends of a section of flexible tubing having a bore dimensioned to receive the shaft such that a spacing between the first and second collars is determined by a length of the section of flexible tubing.

Another aspect of the invention provides a method for balancing photocurrent signals in first and second light sensitive elements of a photosensor. The method comprises passing an offset current through one of the light sensitive elements, the offset current adding to or subtracting from the photocurrent in the one of the light sensitive elements. In some embodiments, the method comprises converting the currents through the first and second light sensitive elements to voltage signals. In some embodiments, the method comprises subtracting a first one of the voltage signals from a second one of the voltage signals.

Further aspects of the invention and combinations of features of various example embodiments are illustrated in the accompanying drawings and/or described in the following description.

BRIEF DESCRIPTION OF THE DRAWINGS

The accompanying drawings illustrate non-limiting example embodiments of the invention.

FIGS. 1A and 1B are schematic drawings illustrating the operation of an example optical force sensor. FIG. 1C is a cross section view on the lines 1C-1C of FIG. 1A. FIG. 1D is an exaggerated schematic illustration showing how applied forces can cause a distribution of light among photosensitive elements of a photosensor to change.

FIGS. 2A and 2B respectively schematically illustrate bi-cell and quad-cell photodiodes and shows example calculations that may be applied to resolve the position of the centroid of a light beam incident on the active areas of the photodiodes.

FIGS. 2C and 2D illustrate a patch of light on a bi-cell photosensor.

FIG. 3D is a schematic drawing showing an example embodiment where a sensor is attached to one face of a member such as a plate or bar.

FIGS. 4A and 4B are perspective views of an example 6 axis optical force sensor. In FIG. 4A the force sensor is mounted on a shaft. FIG. 4B shows active and passive components of the sensor separated.

FIG. 6 is an exploded view of active components of the force sensor of FIG. 4A.

FIGS. 7A and 7B show a sensing module for use in a force sensor.

FIG. 8 is a perspective view of an example circuit board that supports a multi element photodiode.

FIG. 9 shows an example mounting arrangement for a photosensor that includes an off-center inner circle bushing that may be applied for mechanical alignment of the photosensor.

FIG. 20 shows graphs depicting the impulse excitation of the instrument shaft in FIG. 14 in the lateral direction.

DETAILED DESCRIPTION

Figure 2E:
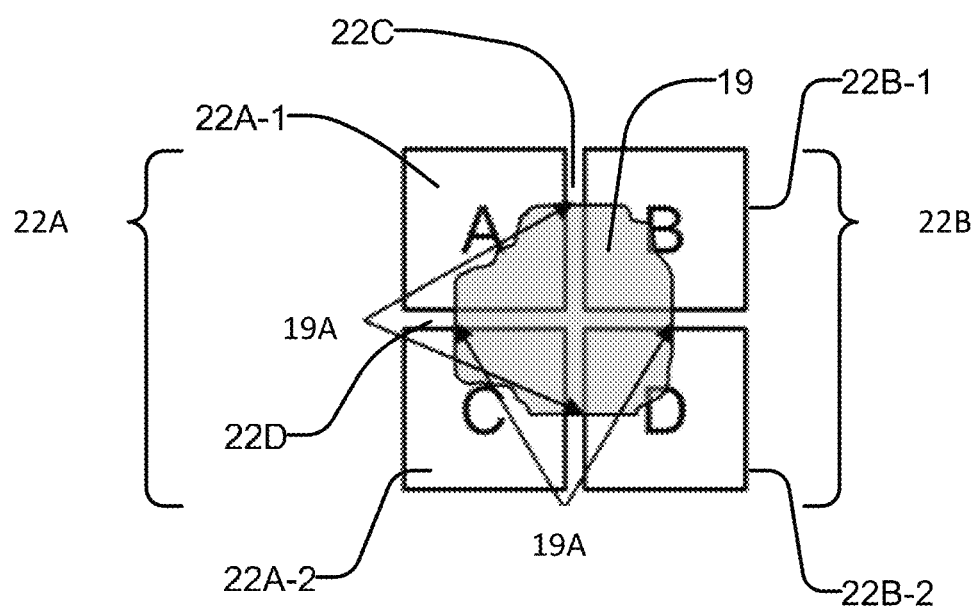
FIG. 2E illustrates a patch of light on a quad-cell photosensor. Each of FIGS. 2C to 2E shows example calculations that may be applied to determine a position of the patch of light on the depicted photosensors.

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive sense.

This invention relates to sensing forces and/or moments (torques) applied to objects. The invention has a very wide range of applications. For example, embodiments of the invention may be applied to applications such as:
  general force sensing;
  generating force feedback signals which may be used for automated control and/or providing haptic feedback in robotic systems;
  force sensing for tele-surgery;

measuring forces on a wall of a container or the like. Such forces may result from pressure differentials across the wall;

monitoring forces on structural members of structures such as bridges, buildings, beams, trusses or the like.

FIG. 1A is a schematic diagram illustrating the principle of operation of an example force sensor 10. Sensor 10 comprises an optical displacement sensor 20 that is operative to sense changes in relative position of a first part 12A and a second part 12B. Parts 12A and 12B are attachable at spaced apart locations to a member 14 to which the force F to be measured is applied. Member 14 is strained by the force. This results in relative movements of first parts 12A and 12B. The magnitude of the relative movements of parts 12A and 12B is correlated to the applied force.

Member 14 may be part of an existing structure. Parts 12A and 12B may comprise clamps or other attachment mechanisms 13A, 13B which respectively couple parts 12A and 12B to member 14. Attachment mechanisms 13A and 13B are configured to prevent parts 12A and 12B from moving relative to the parts of member 14 that they are coupled to. Measuring forces on a structure by attaching parts 12A and 12B to a member 14 that is already part of the structure and measuring strains in the member 14 by monitoring relative displacements of parts 12A and 12B can be advantageous because it does not require changing the structure to incorporate force sensing components.

In the illustrated embodiment, attachment mechanisms 13A and 13B are configured to fit radially around member 14 at two different locations. In other embodiments, attachment mechanisms 13A and 13B may be configured to be bonded onto the surface of member 14 using an adhesive at desired locations. In other embodiments, attachment mechanisms 13A and 13B may be attached to member 14 at spaced apart locations using suitable fasteners, welding, magnets, etc.

Sensitivity of sensor 10 is in part a function of the distance between the locations where attachment mechanisms 13A and 13B couple parts 12A and 12B to member 14. In general mounting attachment mechanisms 13A and 13B to member 14 at locations that are more widely spaced apart will result in more relative motion of parts 12A and 12B for a particular force applied to member 14.

In many cases, the accuracy with which a force F can be measured is increased where sensor 10 is located in a part of member 14 where the applied force F to be measured causes the most deformation of member 14. For example, where member 14 comprises a cantilevered beam the curvature of the beam as a result of a force applied near the free end of the beam tends to be larger close to the fixed end of the beam. However, constraints on the design of sensor 10 and/or the way that parts 12A and 12B are attached to member 14 can vary depending on the location of sensor 10 relative to member 14. For example, where force F is applied at the tip of an arm or tool when the arm or tool is being applied then it may be necessary to place sensor 10 away from the tip of the arm or tool to avoid interfering with the intended function of the arm or tool.

The forces applied to member 14 cause deformation of member 14. The deformation results in changes in the relative positions of first part 12A and second part 12B. Depending on the nature of the forces the deformation may comprise one or more of bending (e.g. resulting from laterally directed forces as shown for example by force F of FIG. 1B), axial compression or extension (e.g. resulting from axially directed forces) and twisting (e.g. resulting from torques).

Member 14 may, for example, comprise:
a cantilever beam; or
a simply supported beam, or
a fixed beam, or
a shaft or torque tube, or
a plate, or
the like.

The magnitude and nature of deformations of member 14 will depend on the location(s) and directions at which forces are applied to member 14, the material(s) and dimensions of member 14 and how member 14 is constrained (e.g. how member 14 is connected to other components).

FIG. 1B illustrates an example deformation of a member 14 configured as a cantilevered beam from the application of a force F.

FIG. 1C is a cross section view through position sensor 20 in the plane indicated by 1C-1C in FIG. 1A. First part 12A comprises a light blocking member or "mask" 16 that includes a window or aperture 16A located to allow light from a light beam 19 to pass through member 16 to a photosensor 22. Movement of window 16A relative to photosensor 22 causes a detectable change in an output of photosensor 22 that is correlated to the distance by which window 16A is moved and therefore is also correlated to the force on member 14 that caused the movement.

In the illustrated embodiment, light beam 19 is emitted by a light source 18. Part of light beam 19 passes through window 16A and is detected by photosensor 22. In the illustrated embodiment, photosensor 22 comprises two or more photocells. For example, photosensor 22 may comprise a bi-cell that combines suitable photocells such as photodiodes 22A and 22B. If window 16A moves in a direction that is transverse to a boundary 22C (see e.g. FIG. 1D) separating photodiodes 22A and 22B, the relative amount of light from light source 18 that falls on photodiodes 22A and 22B will change. This change can be detected, for example as described below.

In preferred embodiments window 16A is elongated. For example, window 16A may have the shape of a parallel-sided slit. In some embodiments window 16A is rectangular. A long axis of window 16A may be oriented parallel to a boundary 22C between photodiodes 22A and 22B. It is convenient for the boundary 22C between photodiodes 22A and 22B to lie along a straight line.

FIG. 1D is a schematic view showing an example bi-cell photosensor 22 seen from the direction of incidence of light from beam 19. In FIG. 1D, window 16A is elongated in a direction that is parallel to boundary 22C. 19-1 indicates a patch of light (which may be called an "illuminated region") on photosensor 22 for a first relative position of window 16A and photosensor 22. 19-2 (dotted lines) shows the position of the patch of light after a change in the relative position of window 16A and photosensor 22 caused by a deformation of member 14 resulting from the application of force to member 14. It can be seen that the change from 19-1 to 19-2 results in less light being incident on photodiode 22A, and more light being incident on photodiode 22B.

Photosensor 22 may comprise a multi-element photodiode (MPD), for example. A MPD is a photosensor having several separate active areas. MPDs are most commonly available in bi-cell and quad-cell configurations (see e.g. FIGS. 2A and 2B). The position of the centroid of a light beam incident on a MPD may be calculated by normalizing the differential photocurrents as illustrated for example by FIG. 2A or 2B.

In some embodiments one or more sensors 10 are connected to member 14 and configured in a way that allows deformations resulting from forces in different degrees of freedom to be sensed. This may be achieved through one or more of connecting one or more sensors 10 in a way that their displacements indicate strains in member 14 resulting from forces in certain degrees of freedom and/or combining outputs from sensors 10 to derive forces in certain degrees of freedom. For example, several sensors 10 may be combined to sense forces applied to member 14 in different directions and/or forces of different types applied to member 14. In some embodiments multiple sensor outputs are processed to yield force measurements in multiple degrees of freedom, for example using a calibration matrix as described herein.

Displacement sensor 10 may be made sensitive to displacements in different directions to enable sensing different forces on member 14. For example, the boundary between cells of photosensor 22 may be oriented perpendicular to a longitudinal axis of member 14 to sense bending or extension/compression of member 14. As another example the boundary between cells of photosensor 22 may be oriented parallel to the longitudinal axis of member 14 to sense twisting of member 14.

Output signals from photosensor 22 may be processed to output a value that varies as a function of displacement of window 16 relative to photosensor 22. Such output values from one or more sensors 10 may be processed to yield outputs that indicate the magnitude and/or direction of forces applied to member 14. Sensors as described herein may be calibrated to provide force measurements in any desired units.

In some embodiments a sensor 10 includes a photosensor 22 that includes more than two photosensitive elements (e.g. the photosensor may comprise a quad-cell MPD). Such sensors 10 may be used to sense components of relative motion in two different directions.

Advantageously, the patch of light (illuminated region) on photosensor 22 may cover all of boundary 22C (as shown in FIG. 2C) or those parts 19A of the perimeter of the patch of light that intersect boundary 22C may be straight line segments that are perpendicular to boundary 22C (as illustrated in FIG. 2D). Other parts of the perimeter may follow an arbitrary path as illustrated schematically in FIGS. 2C and 2D.

In cases where the photosensor has a quad-cell arrangement having two intersecting boundaries the parts 19A of the perimeter of the patch of light 19 that intersect each of the boundaries may be straight line segments that are perpendicular to the corresponding boundary that they cross. This is illustrated schematically in FIG. 2E. FIG. 2E shows that the quad-cell may be seen as having first and second light sensitive elements 22A and 22B which are separated by a boundary 22C. First light sensitive element 22A is divided into two parts 22A-1 and 22A-2 by a second boundary 22D. Second light sensitive element 22B is divided into two parts 22B-1 and 22B-2 by second boundary 22D. Each of parts 22A-1, 22A-2, 22B-1 and 22B-2 generate an output signal when illuminated by patch of light 19. A position of a centroid of patch of light 19 may be determined as shown in FIG. 2E.

A sensor 10 may be constructed so that it is not affected by ambient light by any or a combination of:
- selecting a specific wavelength for the light from light source 18 (e.g. infrared light);
- filtering light incident on photosensor 22 to exclude light of at least some wavelengths not supplied by light source 18;
- shielding the path of beam 19 from ambient light; and
- switching or modulating light source 18 to allow separation of a background signal using a lock in amplifier or similar technology.

Sensors of the basic type described above can be capable of sensing exceedingly small displacements of window 16A relative to photosensor 22 (e.g. it is possible to make such sensors which, with appropriate sensing circuitry, can detect changes in relative positions of window 16 and photosensor 22 on the order of nanometers or even Angstroms).

FIGS. 2A and 2B show example MPDs comprising two (bi-cell) and four (quad-cell) active light sensitive areas, respectively. The position of the centroid of an incident light beam on such an MPD can be calculated by normalizing the different photocurrents captured in the different active areas as shown by equations for X and Y. In the example MPDs shown in FIGS. 2A to 2E, a bi-cell photosensor permits displacement measurements in one dimension (the X axis or Y axis) and a quad-cell photosensor permits displacement measurements in two dimensions (the X and Y axes).

A system using sensors 10 applied to a member 14 as described above may provide various advantages as compared to other force sensors. Some embodiments may provide one or more of the following advantages:
- Such a system may use an existing part of a machine or structure for member 14.
- Such a system may be attached to member 14 with mechanical means (e.g. clamps, fasteners, magnets, etc.) and/or through the use of adhesives, welding etc. This provides great flexibility in adding force measurement capabilities to an existing machine or structure.
- Sensors 10 may be applied without modifying the machine or structure that member 14 is a part of.
- Displacement sensor 10 does not undergo any deformation. Instead it is the deformation of the load-carrying element (e.g. member 14) to which the sensor is mounted that is used to estimate the applied forces. This makes the sensor very robust to overload, permitting overload up to the failure point of the load-carrying element (e.g. member 14).
- At least some ways to mount sensors 10 to a machine or structure do not require extensive surface preparation (as could be required, for example where strain gauges are applied to a part).
- The same construction of displacement sensor 10 may be used to measure forces of a large range of magnitudes due to sensor 10 not undergoing deformation.
- Displacement sensors 10 may be manufactured to fairly loose tolerances while still yielding accurate measurements.
- In displacement sensors 10 all active components (e.g. a light source 18 and photosensor 22) may be included in part 12B. This can simplify power and signal wiring to displacement sensor 10 since part 12A does not need to have any active electronic components or wired connections.

Since displacements can be measured with high sensitivity as described herein, it is not necessary to modify the load carrying structure (e.g. member 14) to sense forces.

Figure 3A:
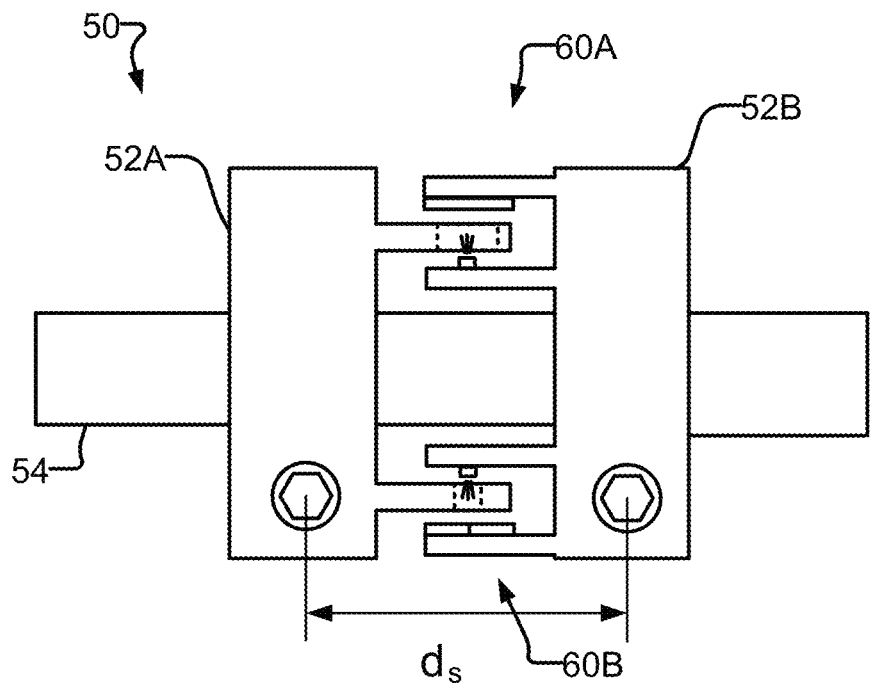
FIG. 3A is a schematic drawing illustrating the installation and operation of multiple optical force sensors.
Figure 3B:
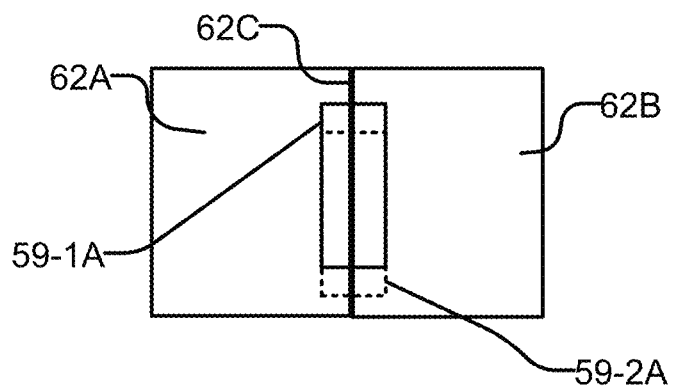
FIGS. 3B and 3C are schematic illustrations showing how applied forces might change the distribution of light among differently oriented photosensitive elements of a photosensor.
Figure 3C:
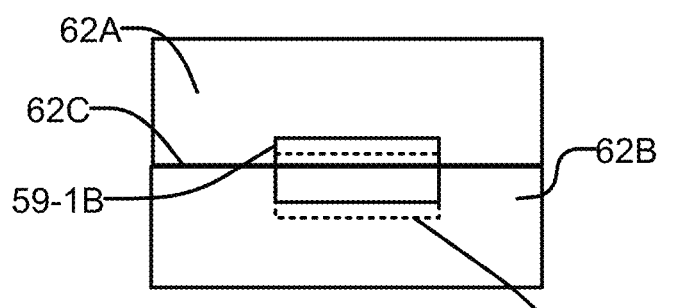

FIGS. 3A to 3C illustrate a force sensor 50 according to a non-limiting example embodiment of the invention. Force sensor 50 comprises parts 52A and 52B that support plural displacement sensing modules. Modules 60A and 60B (collectively or generally modules 60) are shown. Modules 60 are circumferentially spaced apart around a member 54. Member 54 may, for example, comprise a shaft, tube, beam, bar or the like.

First part 52A and second part 52B are attachable at longitudinally spaced apart locations to member 54. Parts 52A and 52B are shown to be attachable to member 54 by means of shaft collars. Other means for coupling parts 52A and/or 52B to member 54 which prevent relative motion between each of parts 52A and 52B and shaft 54 may also be used. Examples of such alternative coupling means include collets, clamps, set screws, press fits, settable fillers, adhesives, strap clamps, and the like. Member 54 is preferably unconstrained between the locations at which parts 52A and 52B engage member 54.

Parts 52A and 52B may each comprise a bore with a shape and size corresponding to the cross-section of member 54. Parts 52A and 52B may each be inserted over a free end of member 54 and be securely attached at desired locations, for example, by tightening a screw of each respective shaft collar to apply a radial compressive force onto member 54.

In some embodiments, parts 52A and 52B each comprise a plurality of separable parts that permit secure attachment to member 54 without requiring member 54 to have an accessible end. As an illustrative example, parts 52A and 52B may each comprise a two-piece shaft collar which allows for separate pieces of parts 52A and 52B to be placed over desired locations on member 54 and clamped together for secure attachment to member 54.

In some embodiments, parts 52A and/or 52B comprise interchangeable sleeves, inserts or spacers of different sizes to facilitate coupling to members 14 having different sizes and/or configurations.

Each displacement sensing module 60 operates to sense displacement. Displacement sensing modules 60 may, for example, operate according to the same principle of operation as sensors 10, which are described above. Where modules 60 are constructed in the general manner of sensors 10, the spacing between first part 52A and second part 52B is selected so that a window 16 of each module 60 is aligned with a corresponding photosensor such that a light beam 19 passing through the window 16 illuminates parts 22A and 22B of the photosensor. The angles of first and second parts 52A and 52B on member 54 are also selectively aligned so that first and second parts of each module 60 are aligned.

The distance between the attachment points of first part 52A and second part 52B may be represented by $d_s$. For longer distance $d_s$, a given curvature of member 54 resulting, for example, from application of a transverse force at one end of member 54 will cause a greater displacement at a module 60 that is angularly positioned away from a bending axis of member 54. It may be desirable in applications where the measured forces are small and/or member 54 is very stiff to have a larger distance $d_s$ so that mechanical amplification of the displacement increases the sensitivity of sensor 50. Conversely, where the measured forces are large or member 54 is not very stiff, a smaller distance $d_s$ may be desirable.

In some embodiments positions of one or both of parts 52A and 52B are adjustable in a direction parallel to a longitudinal axis of member 54 relative to points at which the parts are coupled to member 54. For example, by incorporating a telescoping or threaded coupling. This can allow the same sensor 50 to be adjusted to provide different values for distance $d_s$.

Different ones of modules 60 may be constructed to measure displacements in different directions. For example, one or more modules 60 may be sensitive to displacements in a direction tangential or circumferential to member 54 (such displacements may result from torques applied to member 54 which cause relative rotation of parts 52A and 52B), one or more modules may be sensitive to displacements in a direction that is longitudinal to member 54 (such displacements may result from forces which cause member 54 to bend or be stretched or be compressed, thereby causing parts 52A and 52B at the location of a module 60 to move together or apart).

Where modules 60 operate like sensors 10 and have elongated windows that illuminate an area of a photosensor that overlaps with a boundary between different photocells of the photosensor then the sensitivity of the module to changes in the displacement of the window relative to the photosensor depends on the angle between the direction of displacement and the boundary. This is illustrated by FIGS. 3B and 3C.

In FIG. 3B an example bi-cell photosensor 62 (part of sensing module 60A) is seen from the direction of incidence of light from a light beam 59. 59-1A indicates a patch of light on photosensor 62 for a first position of the window and photosensor 62. 59-2A (dotted lines) shows the position of the patch of light after a change in the relative position of the window and photosensor 62 caused by a deformation of member 54 resulting from the application of force to member 54. In this case the direction of displacement is parallel to boundary 62C between first and second photocells 62A and 62B of photosensor 62. Despite the position of the patch of light changing from 59-1A to 59-2A, the displacement does not change the amount of light incident on each of photocells 62A and 62B. Therefore, photosensor 62 is insensitive to displacements in this direction.

FIG. 3C shows a comparative case where the displacement is in a direction perpendicular to boundary 62C (i.e. the displacement direction is rotated 90 degrees away from the displacement direction of FIG. 3B. 59-1B indicates a patch of light on photosensor 62 for a first position of the window and photosensor 62. 59-2A shows the position of the patch of light after the displacement. It can be seen that the change from 59-1B to 59-2B results in less light being incident on photodiode 62A, and more light being incident on photodiode 62B.

Accordingly, by selecting the orientations of boundaries between photocells in modules 60, individual modules 60 may be made to be sensitive to displacements in a first direction and insensitive to displacements in a second direction perpendicular to the first direction and vice versa. This characteristic may be applied to construct systems which independently measure forces and moments on a member 54.

For example, in a force sensor comprising 2N modules 60 (e.g. 6 or 8 modules 60), N modules 60 may be configured to be most sensitive to axial force and lateral moments. The other N modules 60 may be interleaved with the first N modules and configured to be most sensitive to lateral forces and axial torsion.

In sensor 50 of FIG. 3A, module 60A comprises a window and corresponding photocell boundary oriented parallel to the longitudinal axis of member 54 and module 60B comprises a window and corresponding photocell boundary oriented transverse to the longitudinal axis of member 54. Module 60A is sensitive to displacements arising from changes in the relative angular positions of parts 52A and 52B (e.g. as a result of torque or moment on member 54). Module 60B is sensitive to displacements arising from changes in distance between parts 52A and 52B at the angular position of module 60B. Such displacements can arise from one or more of changes in angle between parts 52A and 52B resulting from bending of the part of member 54 lying between the points where parts 52A and 52B are coupled to member 54 as well as stretching or compression of member 54.

Other embodiments may provide different numbers of sensing modules. The modules may be spaced circumferentially around member 54. Sensing in multiple degrees of freedom is possible when multiple sensing modules are provided. At least one displacement measurement is needed per degree of freedom. For example, sensing in six degrees of freedom may be achieved through the use of six sensing modules. As an example, force sensing systems may be constructed to measure forces applied to member 54 resulting in deflections in X, Y, and Z directions ($F_x$, $F_y$, $F_z$) and twisting and bending moments applied to member 54 resulting in rotations along X, Y, and Z axes ($M_x$, $M_y$, $M_z$).

FIG. 3D shows another example in which a sensor 10A (which may have a construction that is the same as or similar to sensor 10 of FIG. 1A) is attached at spaced apart locations to the surface of a member 14A by surface mounts 19A and 19B. Surface mounts 19A and 19B may be held to the surface of member 14A by any suitable means including adhesive, magnets, welding, screws, vacuum suction or the like. In some embodiments plural sensors 10A are attached to member 14A at different locations (e.g. on different faces or surfaces or sides of member 14A and/or at different locations on a face surface or side of member 14A and/or with surface mounts 19A and 19B spaced apart along lines extending in different directions on one or more faces or surfaces of member 14A. Member 14A may comprise a plate, bar, shaft, beam, or any other structural member that may be strained by the application of forces.

Example 6—Sensor Embodiment

FIGS. 4A and 4B illustrate a force sensor 100 according to an example embodiment. Force sensor 100 includes several (in this example six) force sensors that each operate according to the principle of force sensor 10. Force sensor 100 has two main parts that can be attached at spaced apart locations to a member such as a shaft, rod, or the like. First part 102 contains active components (e.g. light sources such as LEDs 138, LED driving circuits, photosensors such as bi-cells 134, photosensor boards 124 that support and provide electrical connection to the photosensors and optionally provide circuitry for operating the photosensors and/or conditioning and/or detecting signals from the photosensor, and a power and communication board 140).

Second part 104 can be a passive component (no active electronics are required on second part 104) that supports members which modulate light beams incident on each photosensor. Using a passive part 104 to control the light incident on each photosensor facilitates easier management of wires and reduces the possible effect of bending/tension in wires on force measurements.

Figure 5:
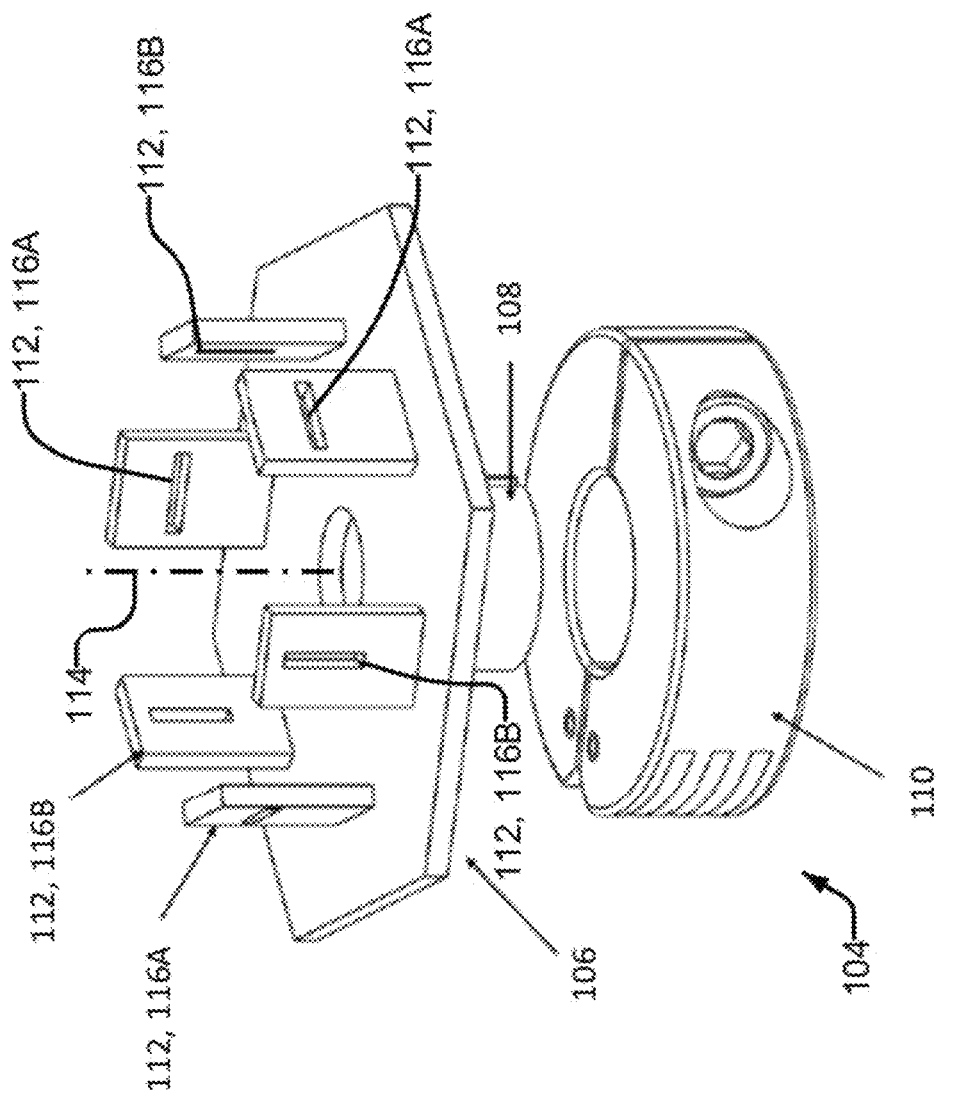
FIG. 5 is an exploded view of a passive component of an example force sensor.

FIG. 5 is an exploded view of passive part 104. Part 104 comprises a mount interfacing assembly 106 that is adapted to be secured to a support structure (e.g. member 14). In the illustrated embodiment assembly 106 comprises an axially extending flange 108 that can be clamped around a member by a shaft collar 110.

Passive part 104 has six light blocking members 112 arranged in two groups. The first group has windows in the form of slits 116A arranged perpendicular to an axis 114 of part 104. The members of the second group, which alternate with the members of the first group, have windows in the form of slits 116B arranged parallel to axis 114.

Light blocking members 112 may, for example comprise plates of metal, ceramic, a suitable plastic or another suitable material that is opaque or highly attenuating to light emitted by light sources on first part 102. In the illustrated embodiment, light blocking members 112 in each group are spaced 120 degrees apart about the sensor axis (e.g. axis 114 which may coincide with a centerline of member 14).

FIG. 6 is an exploded view of active part 102. In this example, part 102 includes six sensing modules 120 in a hexagonal arrangement. Each sensing module 120 may be secured to main chassis 130 of active part 102. Sensing modules 120 may have the same or similar constructions. For example, sensing modules 120 illustrated in FIG. 7 have identical frames 122, LED boards 124, and photosensor boards 126.

In the example embodiment of FIG. 6, photosensors on photosensor boards 126 are bi-cells. Three of modules 120 which correspond to the first group of light blocking members 112 of passive part 102 have bi-cells are oriented so that the boundary between photocells extends transversely relative to axis 114. The other three sensing modules 120 correspond to the second group of light blocking members 112 and have bicells oriented parallel to the longitudinal centerline of shaft 14. Modules 120 of each group of three sensing modules 120 are positioned equidistant at 120 degrees with respect to each other about axis 114.

FIGS. 7A and 7B illustrate a possible construction of modules 120. In this example, each module 120 comprises a frame 122 configured to be attached at a desired location on active part 104 (e.g. by bolts 128). Frame 122 supports circuit boards 124, 126 which respectively provide a light source and a light detector. Frame 122 defines a cavity 132 dimensioned to receive a light blocking member (e.g. 112) configured to pass light from the light source to the light detector through a window but to block other light from reaching the light detector.

A sensor with another number of sensing modules could also include sensing modules 120 with bi-cells of different groups of sensor modules 120 oriented in different directions. In some embodiments each sensing module 120 has neighboring sensor modules in which bi-cells have orientations different from the orientation of its own bi-cell. For example, 8 sensing modules arranged in a ring could be provided for six degree of freedom sensing with averaging and error correction capabilities.

It is convenient but not necessary that the sensing modules 120 are arranged in a symmetrical arrangement. In some but not all embodiments modules 120 are spaced equally from a longitudinal centerline of member 54. In some but not all embodiments modules 120 are equally angularly spaced apart around the longitudinal centerline of member 54.

In some but not all embodiments one group of N modules 120 is symmetrically spaced apart around member 54 at a first radius from the longitudinal centerline of member 54 and another group of M modules 120 is symmetrically spaced apart member 54 at a second radius from the longitudinal centerline of member 54 (where M and N are integers. In some such embodiments M≥3 and/or N≥3. In some such embodiments the first radius is larger than the second radius. In some embodiments the first radius and second radius are equal. In some embodiments the first group of modules have photosensors arranged so that a boundary between photocells has a first relationship to the longitudinal centerline of member 54 (e.g. parallel or at an angle of −45 degrees) and the second group of modules have photosensors arranged so that a boundary between photocells has a second relationship (e.g. transverse or 45 degrees). In some embodiments the first and second groups of modules differ with respect to the orientation of planes of the passive parts relative to the longitudinal centerline of member 54.

Suitable circuitry is provided to provide light, detect outputs of photocells in photosensors and process the outputs of the photocells to characterize one or more forces applied to a member 14. These circuits can be physically arranged in a variety of ways and may have various electrical designs.

In an example embodiment, photosensors are provided on photosensor boards 126 (see FIG. 8). In this example embodiment photosensor board 126 supports bi-cell 134, connector 136, and a signal conditioning circuit 137 (see FIG. 10). Signal conditioning circuit 137 optionally includes an analog to digital converter.

It can be advantageous to provide signal conditioning for the output signals from photosensors and analog to digital conversion in close proximity to the photosensors. This can reduce the pickup of noise in the output signals. For example, the signal conditioning and analog to digital conversion may be provided on photosensor boards 126. Photosensors may be mounted to photosensor boards 126 or photosensor boards 126 may be directly adjacent to the photosensors. Other arrangements which place signal conditioning and analog to digital conversion for outputs from the photosensors close to the photosensors are possible. In some embodiments the signal conditioning and analog to digital conversion for outputs from the photosensors is performed within 80 mm of the photosensors.

Figure 10:
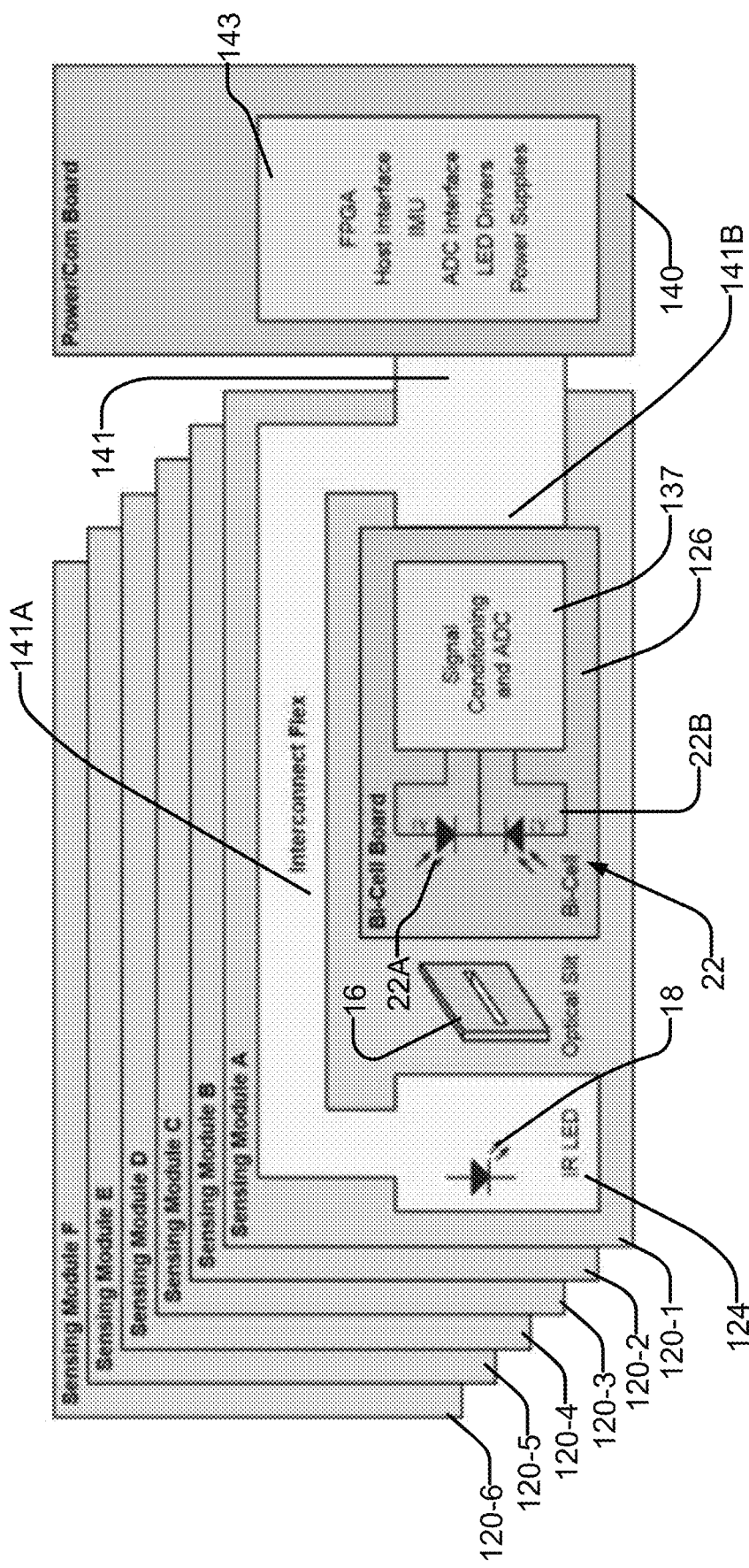
FIG. 10 is a schematic illustration of an example way that electronic and data processing parts of a force sensor may be arranged.
Figure 10A:
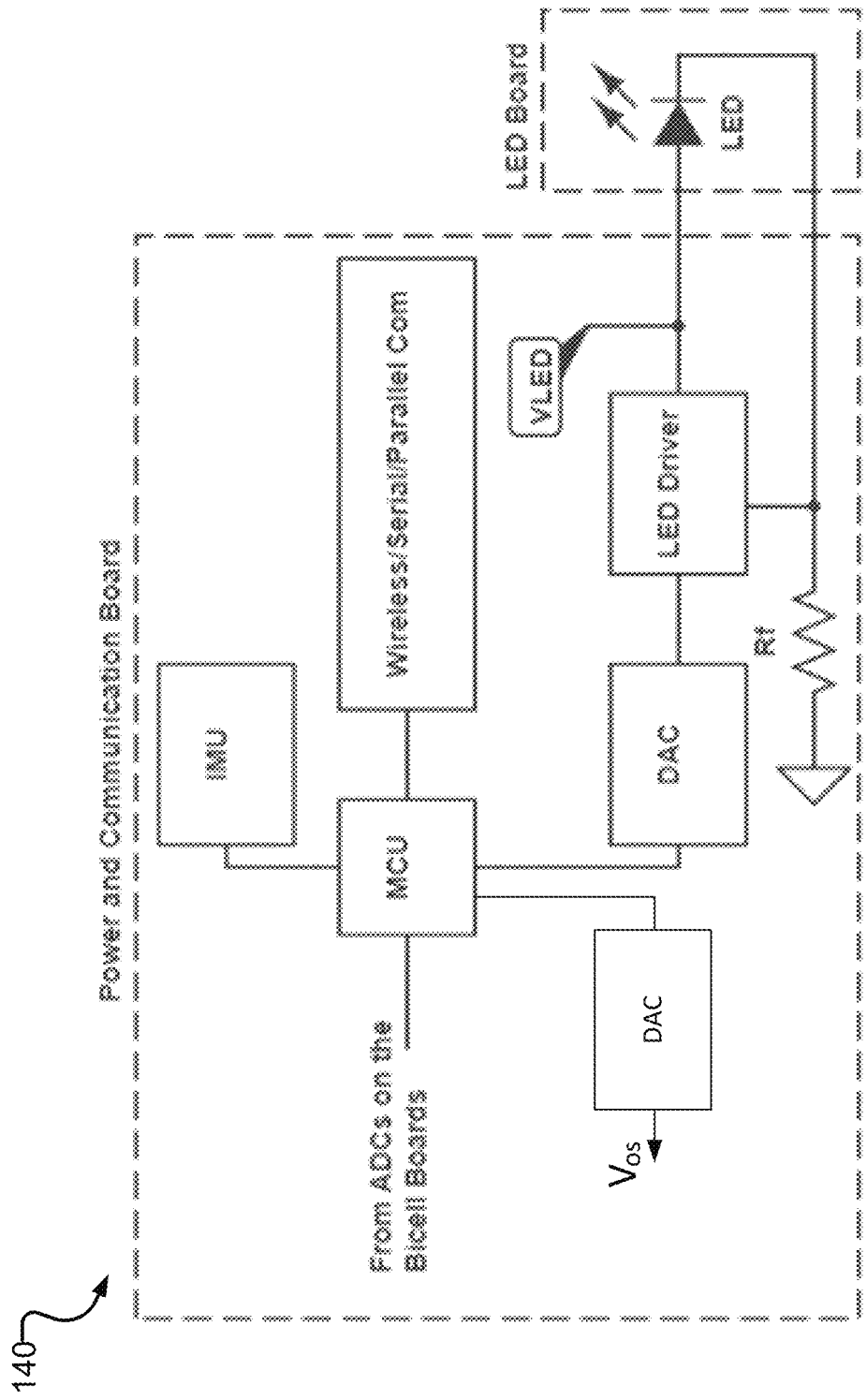
FIG. 10A is a simplified schematic diagram showing electronics which may be provided on a power and communication board.

LED board 124 supports an LED 138. In each module 120, LED board 124 and photosensor board 126 are electrically interfaced to a power and communication board 140 (e.g. as shown in FIG. 10 or 10A) through a connector 136 and a flexible circuit. LED driving circuitry may be located away from modules 120 (e.g. on power and communication board 140) so that any heat is dissipated away from sensing module 120 and to minimize possible thermal drift.

FIG. 9A shows an example arrangement for mounting a bi-cell or other photosensor that permits the bi-cell to be aligned with a light beam (e.g. so that the light beam straddles a boundary between photocells of the photosensor). A bushing 142 has an eccentric hole 142A having eccentricity $e_c$ (see FIG. 9B) accommodates the bi-cell 134. Bushing 142 supports and electrically isolates bi-cell 142 from frame 122. Bi-cell 134 may be mechanically aligned with light incident trough a window by rotating bushing 142. This moves bi-cell 134 with the eccentric hole on a circle with the radius of eccentricity $e_c$. A setscrew 144 secures the bushing 142 and consequently the bi-cell 142 in the aligned position. This alignment mechanism may allow looser tolerances during manufacture of a module 120.

First part 102 may be secured to the support structure (e.g. member 14) using a mount interfacing assembly 146 and a shaft collar 148 as shown in FIG. 6. Spacers 150A and 150B may be placed between boards to allow for the height of the components and prevent loading the components during assembly.

During mounting of sensor 100 on the support structure (e.g. member 14), the light blocking members 112 of second part 104 are positioned so that their slits 116A and 116B are located between LEDs 138 and the corresponding bi-cells 134 in sensor modules 120. Light blocking members with slits 116A may correspond to (i.e. be placed between) sensor modules 120 with bi-cells oriented transversely relative to member 14. Light blocking members with slits 116B may correspond to sensor modules 120 with bi-cells oriented parallel relative to member 14.

Force sensor 100 is an example of a way that the present technology may be applied using a modular construction with a plug-and-play design. No wires internal to force sensor 100 are required. Board to board connectors may be used to route electrical signals. Such sensors can be easy and quick to assemble and maintain with no need of special tooling. Additionally, the components of sensor 100 have simple designs that can be produced inexpensively using standard subtractive and/or additive manufacturing techniques (e.g. machining, 3-D printing etc.).

The relative displacement between the slits and the LED-bi-cell pairs, due to deformations of the support structure, change the light incident on the active elements of the bi-cells and are tracked to estimate the external forces.

FIG. 10 illustrates one possible organization of an electrical system for receiving and processing outputs from photosensors according to an example embodiment. FIG. 10 shows a plurality of modules 120 (modules 120-1 to 120-6 are shown). Each module 120 includes a light source board 124 which supports light source 18 (e.g. an infrared emitting LED) and a photosensor board which supports a photosensor 22 and signal conditioning circuit 137. A power and communication board 140 is connected to control light sources 18, for example by way of conductors 141A. Power and communication board 140 is connected to provide control signals to and to receive output signals from signal conditioning circuit 137 by way of conductors 141B. Conductors 141A and 141B may, for example, be parts of a flex interconnect 141. In the illustrated embodiment power and communication board 140 includes a FPGA 142 that is configurable to perform data processing functions.

Power and communication board 140 may, for example, comprise functionality as shown in FIG. 10A. In the illustrated embodiment, board 140 includes a Microprocessing Control Unit (MCU), which could be a microprocessor and/or other programmable electronics such as a Field Programmable Gate Array (FPGA). The MCU may process sampled analog signals received from modules 120.

Board 140 may receive power from an external source or use an onboard battery. The proximity of bi-cells 134 to power and communication board 140 in the illustrated embodiment advantageously minimizes noise and electromagnetic interference on the measurements.

A sensor as described herein may include an accelerometer or inclination sensor such as an Inertial Measurement Unit (IMU). An IMU may measure linear accelerations, angular velocities, and/or rotation vectors. An IMU may be used for compensation of gravitational and inertial forces. This can be desirable, for example, in applications that involve a change of configuration and possible dynamic effects. In the illustrated embodiment, an IMU is provided on board 140. In some embodiments, an MCU compensates force measurements to account for the effect of gravity based on output signals from the IMU.

Resolved force information along with other data from power and communication board 140 may be transmitted to a host device such as a PC, data logger, controller, mobile device application or the like through a communication module. Any suitable communication hardware implementations and protocols may be provided. Some examples are: local area network interfaces (e.g. an Ethernet link), local interfaces such as a USB connection and/or other serial or parallel communication ports, wireless communications such as WiFi, Bluetooth, cellular data (e.g. LTE or 4G or 5G), an optical port or infrared data transmitter etc. The use of a wireless communication link allows the sensor to operate in a standalone configuration with no wires attached to it. A standalone sensor is advantageously not affected by side loads due to interfacing wires (signal and/or power) that could adversely affect the sensor's accuracy.

Figure 11A:
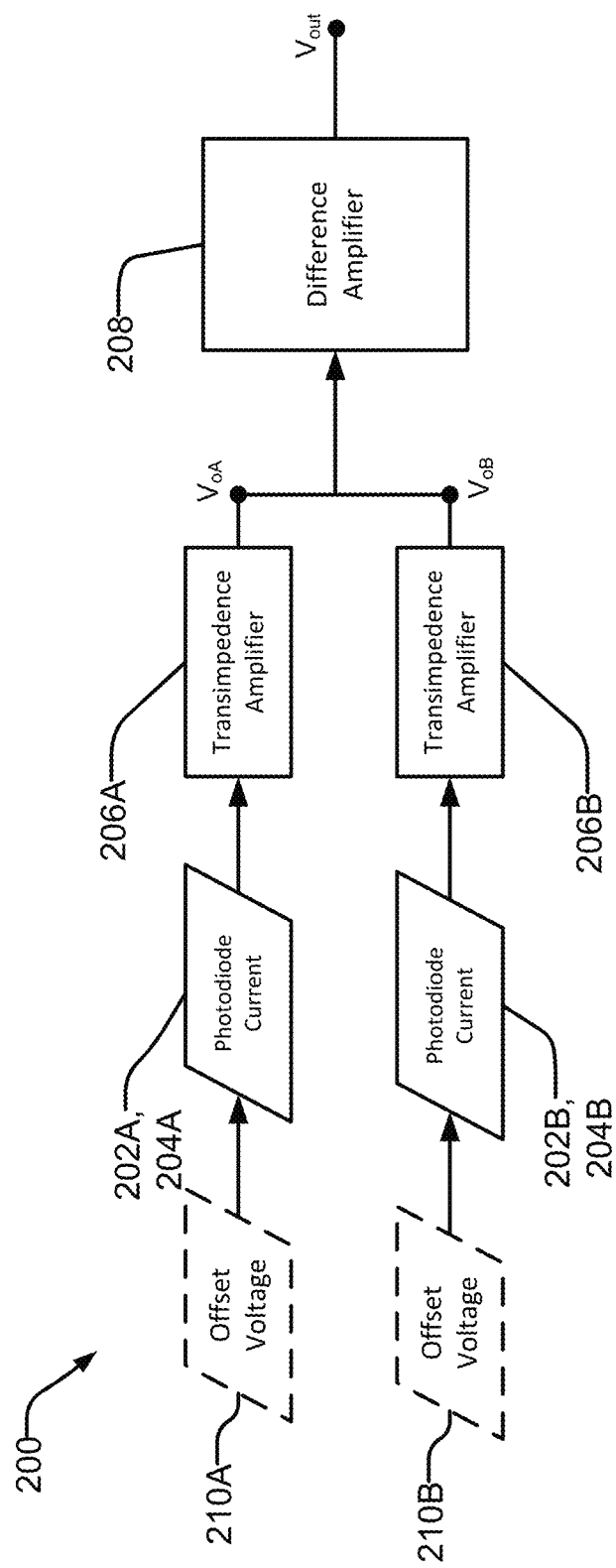
FIG. 11A is a schematic block diagram of an example signal conditioning circuit.
Figure 11B:
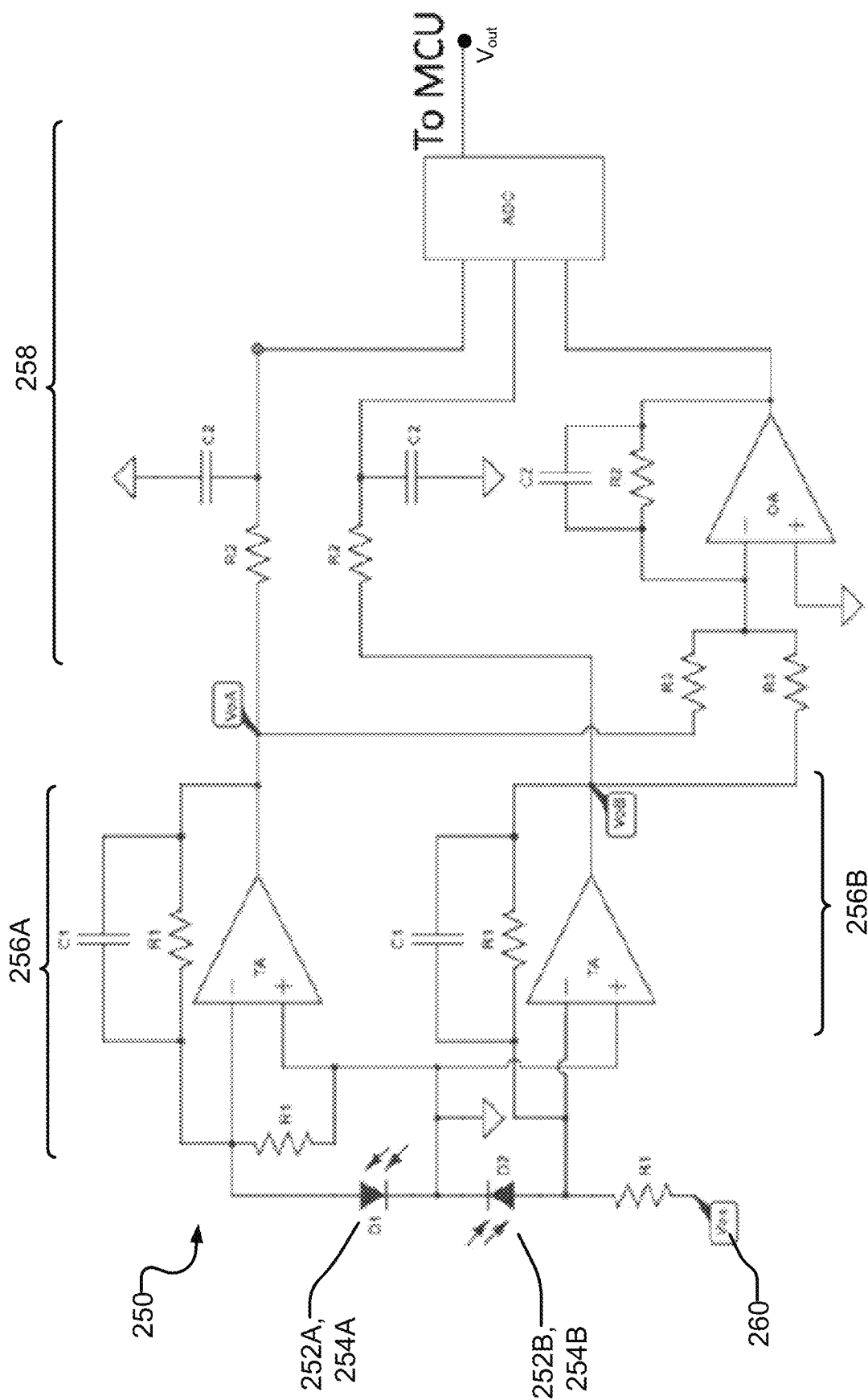
FIG. 11B is a schematic circuit diagram of an example signal conditioning circuit.

FIGS. 11A and 11B illustrate example signal conditioning circuits. FIG. 11A is a block diagram of an electronic circuit 200 that may be used to detect signals from first and second photodiodes 202A and 202B (e.g. photodiodes 22A and 22B in the FIG. 1 embodiment). Circuit 200 processes outputs of bi-cell photosensors. The principle of operation of circuit 200 may be applied to different photosensor configurations, such as quad-cells.

When light is emitted onto active areas of first and second photodiodes 202A and 202B (or other light-sensitive elements) of a bi-cell, first and second photocurrents 204A and 204B are respectively produced. These photocurrents are inputs to circuit 200.

In some embodiments the photocurrents are processed to yield a DIFFERENCE signal representing the difference between the photocurrents and a SUM signal representing the sum of the photocurrents. The SUM signal may, for example be provided by a summing circuit or may be determined by sampling and summing signals representing the photocurrents. The DIFFERENCE signal may be normalized (e.g. divided by) the SUM signal to yield a value that indicates the position of the window relative to the bicell photodetector. This normalized value may be calibrated for use in force estimation.

In the example embodiment illustrated in FIGS. 11A and 11B, each photocurrent 204A and 204B is converted to a voltage signal. This may be achieved using transimpedance amplifier (TIA) circuits 206A and 206B to convert the photocurrents into voltages. Voltages corresponding to the converted photocurrents 204A and 204B are represented as voltages $V_{OA}$ and $V_{OB}$, respectively. Voltages $V_{OA}$ and $V_{OB}$ are used as inputs to difference amplifier 208 which produces a resultant output voltage $V_{out}$. $V_{out}$ is a function of (e.g. proportional to) the difference between input voltages $V_{OA}$ and $V_{OB}$. $V_{out}$ is an example of a DIFFERENCE signal.

Circuit 200 may additionally provide filtering. For example, circuit 200 may incorporate a low pass filter to achieve a desired signal-to-noise ratio. The low pass filter may optionally be combined with TIA circuits 206 and/or difference amplifier 208.

In some embodiments the low pass filter has a cut-off frequency such that circuit 200 only passes signals corresponding to frequency components of the photocurrents 204A and 204B that are below the cut-off frequency. In some embodiments, the cut-off frequency is 1 kHz or lower (e.g. 500 Hz).

It is beneficial to provide a way to adjust the output of circuit 200 for a given alignment of a window 16 and a photosensor 22. In some embodiments an offset adjustment mechanism is provided that operates in the analog domain. In some embodiments, such an analog offset mechanism operates by adding or subtracting electric current to the photocurrent of one or more photodiodes or other light sensitive elements. The added or subtracted current may, for example comprise controlling a current source such as external offset voltage 210 connected to deliver an offset current through one of first and second photodiodes 202A and 202B. The offset current combines with the photocurrent and alters the corresponding one of voltages $V_{OA}$ and $V_{OB}$.

Optionally, offset currents of different magnitudes are applied to adjust both of voltages $V_{OA}$ and $V_{OB}$ to achieve a desired relationship between these voltages. The offset current(s) are applied upstream from the operation of TIA circuit(s) 206 to add to or subtract from the measurement of one or both of photocurrents 204A and 204B.

In some embodiments, it is desirable for output voltage $V_{out}$ to be 0V when no forces are being measured. In some embodiments, the application of offset voltages 210A and 210B may be adjusted to result in equal values for $V_{OA}$ and $V_{OB}$ in the absence of a force.

In some embodiments offset currents may be provided which cause $V_{out}$ to be 0V or to have another desired value when the measured force has a specified value. This may be desirable, for example, where member 14 is normally subject to a constant load and deviations from the applied load are of interest. Such offset currents can advantageously be provided prior to converting current signals to voltage signals. In some embodiments the offset currents pass through one or both of photodiodes 202A and 202B of a bi-cell.

In some embodiments, offset voltages may be provided downstream from TIA circuits 206 but upstream of difference amplifier 208. The application of such downstream offset voltages may result in equal values for $V_{OA}$ and $V_{OB}$ in the absence of a force. Alternatively, the application of such offset voltages may cause $V_{out}$ to be 0V or to have another desired value when the measured force has a specified value. In other embodiments, an offset voltage downstream of difference amplifier 208 causes $V_{out}$ to be 0V or to have another desired value. Where the output of difference amplifier 208 is in the digital domain, the offset voltage may be applied through a digital voltage regulator.

FIG. 11B is a more detailed schematic diagram for a circuit 250 that may be used to obtain an output signal that may be processed to indicate a detected force. In FIG. 11B, a signal conditioning circuit converts photocurrents in the photosensitive elements of the associated bi-cell to voltages ($V_{OA}$ and $V_{OB}$) and samples the differential signal ($V_{OA}$-$V_{OB}$) and the scaled inverted sum signals using an Analog to Digital Converter (ADC).

The ADC may have a high resolution to enable measurement of small forces. In some embodiments the signal conditioning circuitry may include a programmable gain amplifier (PGA) to facilitate high-resolution measurements over a large dynamic range. This feature may also reduce the risk of saturating the sensor output. The PGA, if provided, may, for example, be integrated with the ADC.

In the FIG. 11B circuit, photodiodes 252A and 252B each produce a photocurrent 254A and 254B. The photocurrents (one or both of which are optionally modified by a corresponding offset current) are converted to voltages $V_{OA}$ and $V_{OB}$ by TIA circuits 256A and 256B, respectively. FIG. 11B enables provision of an adjustable offset current through photodiode 252B. Offset voltage 260 may be adjusted to apply a current through photodiode 252B such that the currents respectively presented at the inputs of TIA circuits 256A and 256B have a desired balance. Amplifier 258 produces a resultant output voltage VO, which is proportional to the difference between input voltages $V_{OA}$ and $V_{OB}$.

The electrical circuits described herein have general application in processing signals from bi-cells and are not limited to use with sensors as described herein but may be used also with other photosensors.

Figure 11C:
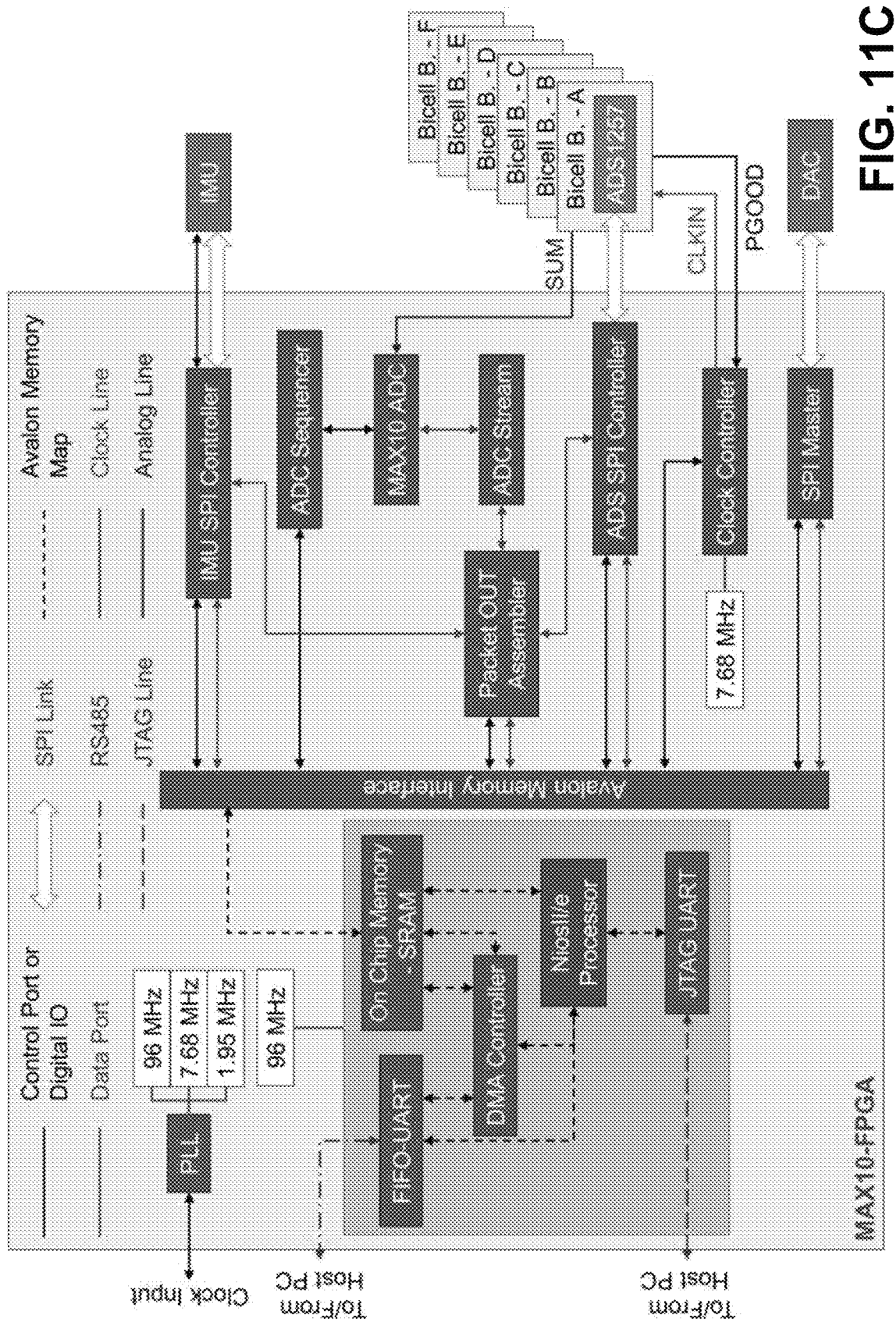
FIG. 11C is a block diagram showing example functional components implemented in a FPGA.

Applying a FPGA to process signals from modules 120 can advantageously facilitate low latency operation through parallel processing. FIG. 11C is a functional block diagram of an example way that an FPGA may be applied. In this example, FPGA has two main functions: (1) exchanging data with a host computer via a RS485 link (or other communication link), and (2) interfacing with FPGA peripherals (photosensor boards 126, IMU, DAC, temperature sensor and EEPROM etc.).

FPGA 142 may, for example be programmed using programming tools such as VHDL. A data processor (in this example a Nios II/e processor) is instantiated into the FPGA. The data processor is configured to initializes the device peripherals (IMU, ADC, and DAC) after sensor power up. During normal operation, the data processor is idle except that it listens for input commands from software running on the host PC and triggers a predefined action.

Figure 11D:
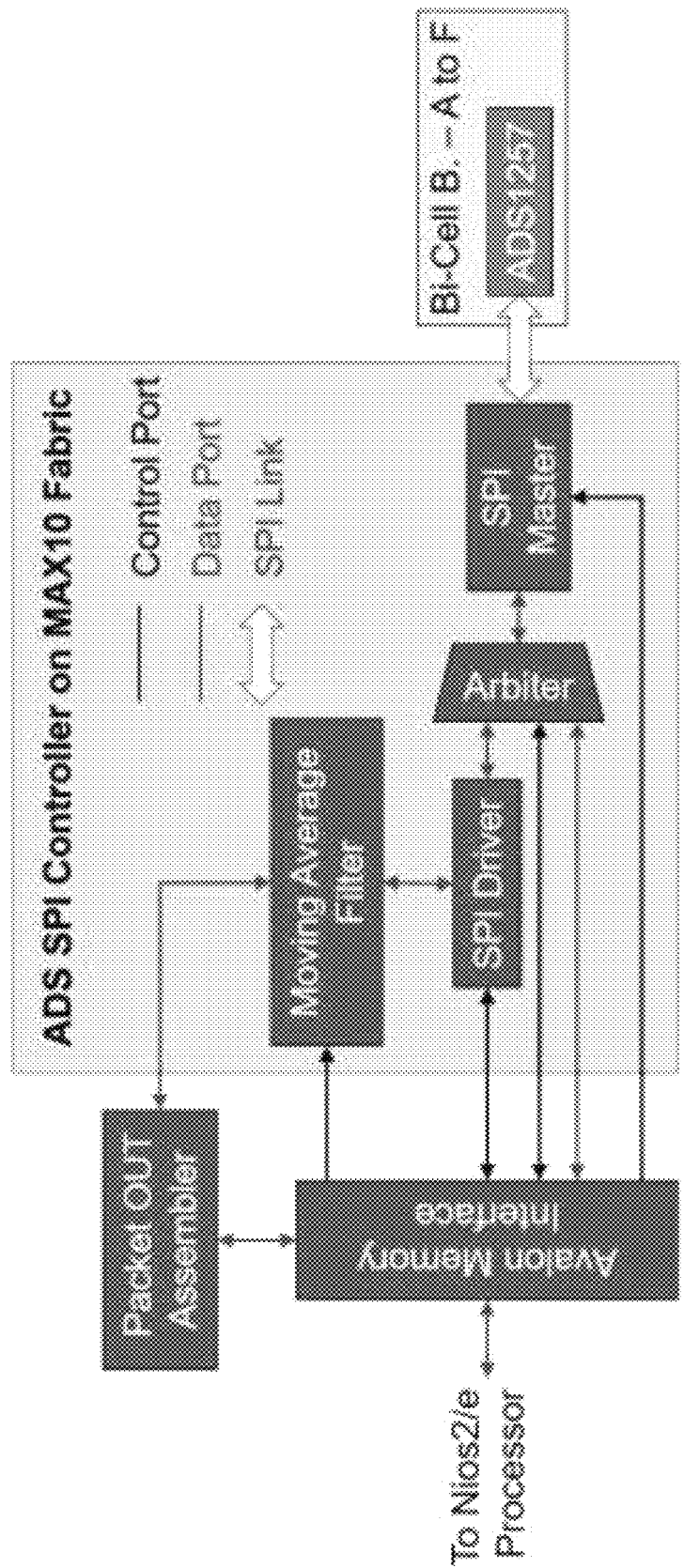
FIG. 11D is a block diagram showing example functional components of an ADS SPI controller according to an example embodiment.

In this example, DIFFERENCE signals from each photosensor board 126 are sampled at a suitable rate (e.g. at 30 kSPS). As shown in FIG. 11D a controller may include a SPI master, an arbiter, a SPI driver, and a moving average filter. The SPI master handles 1-byte full-duplex transactions with the ADCs associated with modules 120. The arbiter manages access to the SPI master by the data processor or the SPI driver. The data processor initializes the ADCs upon power-up and then hands over the control of the SPI master to the SPI driver for continuous reading of the sampled DIFFERENCE data.

Because one ADS conversion cycle requires 33 µs, the ADSSPI Controller continuously requests data conversions and stores the results in registers. The read data is fed to a moving average filter that further reduces the risk of aliasing and helps to reduce the noise level in the measurements. The filter may, for example, have a bandwidth of approximately 500 Hz.

In an example embodiment the filter averages the incoming data over a moving window of 27 samples. A 27-point moving average filter with fDR=30 kHz has its −3 dB bandwidth at 492 Hz which is close to the desired bandwidth of 500 Hz The IMU SPI controller continuously reads the SPI data after the IMU has been initialized by the data processor. The controller, as shown, for example, FIG. 11E may have a design identical to the ADS SPI controller without the moving average filter. The IMU data rate can vary between 100 to 1000 Hz depending on its configuration and the sensor of interest (gyro, linear acceleration, rotation vector etc.).

In this example, the FPGA includes an integrated ADC. The integrated ADC is connected to sample a SUM signal from each of photosensor boards 126 The "ADC Sequencer" controls the multiplexer of the FPGA's integrated ADC. The "ADC Stream" parses the sampled SUM data and saves it in the register associated with the sampled channel. Because the ADC can sample at data rates up to 1 MSPS, a moving average filter can optionally be cascaded to the output data stream to improve the noise level in the SUM measurements.

Communication with the DAC that controls the LED currents is through another SPI master and is directly managed by the data processor.

Data transfers to a host computer are managed in this example by a Direct Memory Access (DMA) Controller and through a UART core with FIFO buffer. The UART to RS485 bridge can operate at baud rates up to 20 Mbps. When the software requests data in polling mode, the data processor enables the Packet-Out Assembler. The Packet-Out Assembler reads one snapshot of all the peripherals' registers with their most recent values in one clock cycle. The Packet Out Assembler combines the sampled data in a pre-configured structure, calculates a CRC32 checksum, and prefixes the data with a header.

In an example case the data is arranged in a structure of 47 bytes The header includes a start byte, a 1-byte packet number, and a CRC8 checksum and the data-out packet, for transmission to the host computer, is 54 bytes long (including the header and the checksum).

Figure 11E:
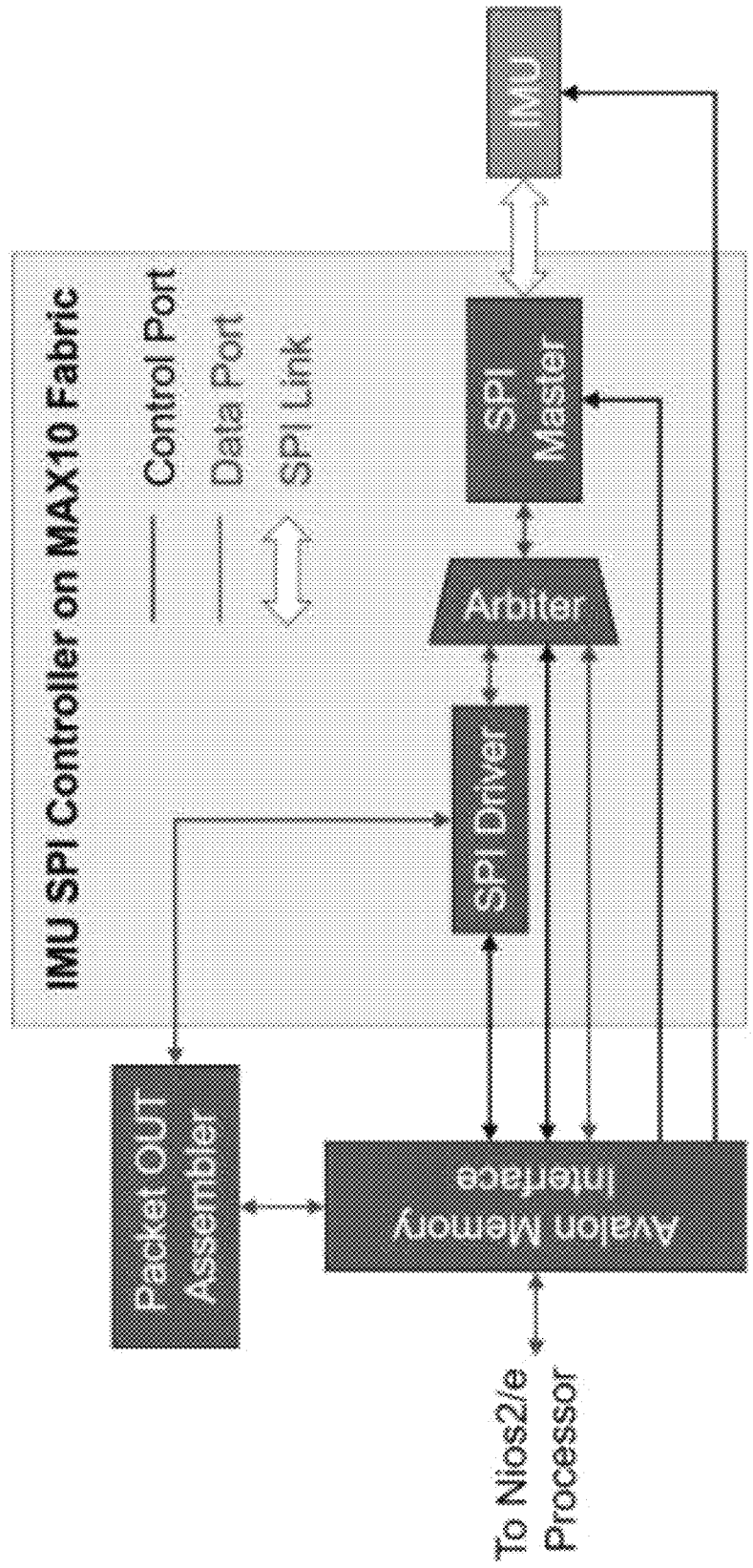
FIG. 11E is a block diagram showing example functional components of an IMU SPI controller according to an example embodiment.

In a prototype system which included a FPGA configured as in FIGS. 11C, 11D and 11E, with the FPGA core running at 96 MHz, one call to the Packet-Out Assembler takes 4.3 µs to complete. Once the data-out packet is ready, an interrupt is triggered that initiates the DMA controller. The UART core transmits data as long as the FIFO buffer is not empty. With the USB-RS485 Bridge operating at 6.85 Mbps, each transfer of the 54-byte packet takes only 55 µs. Therefore, upon initiating the CRC calculation, it takes less than 60 µs until the data-out packet is completely transferred. With the firmware code overhead, the execution time required after receiving the command from the host computer is approximately 86 µs. This allows for data rates up to 11.5 kHz. Faster data communication hardware may be used to achieve shorter latency.

A system as shown in FIGS. 11C to 11E may be configured to operate in a streaming mode, in which the FPGA continuously transmits data at a specified rate. The data rate may be adjusted by input command. Continuous data streaming may use a a timer interrupt to enable the Packet-Out Assembler.

The host computer may execute software instructions to process SUM and DIFFERENCE values to obtain measures of sensed forces and/or moments. The software instructions may, for example, read and parse the incoming data into (1) DIFFERENCE and SUM values for each module 120, and (2) IMU data (Linear accelerometer, gyroscope, rotation vector, etc.). The parsed data may be processed by a calibration routine to resolve force and torque values. The calibration routine may, for example, compute normalized sensor output signal values (e.g. by dividing DIFFERENCE values by corresponding SUM values) and may calculate forces and/or moments by multiplying a vector of the normalized sensor output signal values by a calibration matrix.

In some embodiments, data is received at a host computer in a streaming mode. At the host computer the input buffer is constantly read. Incoming data is parsed and processed to resolves the force/torque and IMU data. The resolved force/torque and IMU data is written into an internal LIFO (Last In First Out) buffer. These actions may be performed by a separate thread runs continuously; once started. The LIFO buffer is globally accessible for reading to all threads and has limited capacity so it keeps only the most recent few packets. This architecture has multiple advantages; (1) it is fast and non-blocking, (2) the receive buffer is emptied constantly, and the LIFO internal buffer ensures the most recent available packet is always used, and (3) memory usage is not a concern because only the most recent few packets are retained.

It will be apparent to those skilled in the art that the components and the configurations thereof described for force sensor 100 are examples only. Many alterations and modifications are possible without departing from the spirit of the invention. For example:

Light sources other than LEDs may be employed. For example the light sources may comprise laser diodes, other lamps, light transmitted via optical fibers, etc.

An alternative embodiment of the sensor could have 3 quad-cells instead of bi-cells 134 in a similar frame 122.

It is not mandatory to provide sensing modules in which photosensor boards 126 and LED boards 124 are electrically interfaced to a common power and communication board 140. For example, each sensing module 120 may comprise an onboard power source and its own MCU for sampling analog signals and delivering instructions to LED board 124. On other embodiments LEDs and/or photosensors are directly mounted in a sensor or sensing module.

It is not necessary for light sources to be on continuously. Light sources may be turned on only when measurements are taken. For example, where it is desired to make measurements of forces and/or moments at a certain frequency the light sources of the optical sensors may be turned on briefly in time to take the measurements. A duty cycle of the light sources may be low. For example, the light sources may be on for $\frac{1}{25}$, or $\frac{1}{50}$ or $\frac{1}{100}$ of the time or less.

A light guide may be used to deliver light from a central source to each of slits 116A and 116B instead of providing separate light sources on each sensor module 120.

The passive element in sensors as described herein is not limited to being a window in a piece of metal or other substantially opaque material. A passive element may comprise one or more optical elements such as mirrors, lenses, prisms, or the like that steer light of a light beam (e.g. beam 19) onto an area of a photodetector such that movement of the passive element relative to the photodetector results in a change in the area of the photodetector that is illuminated. In some embodiments the optical elements are configured to shape the beam of light into an elongated patch of light that illuminates an elongated area on the photodetector.

The orientations of displacement sensors as described herein may be varied. For example, in some embodiments some or all displacement sensors are oriented such that the passive element lies at least generally in a plane that extends radially relative to a member 14 (i.e. the plane in which the passive element lies intersects a longitudinal central axis of the member 14 in some embodiments).

The orientations of windows 16 in the passive elements may also be varied. For example, embodiments described above provide displacement sensors in which elongated windows are oriented parallel to and/or transverse to a longitudinal central axis of member 14. In some other embodiments some or all passive members have elongated windows that are oriented in other directions. For example elongated windows may be oriented at 45 degrees to a longitudinal center line of member 14.

Figure 12:
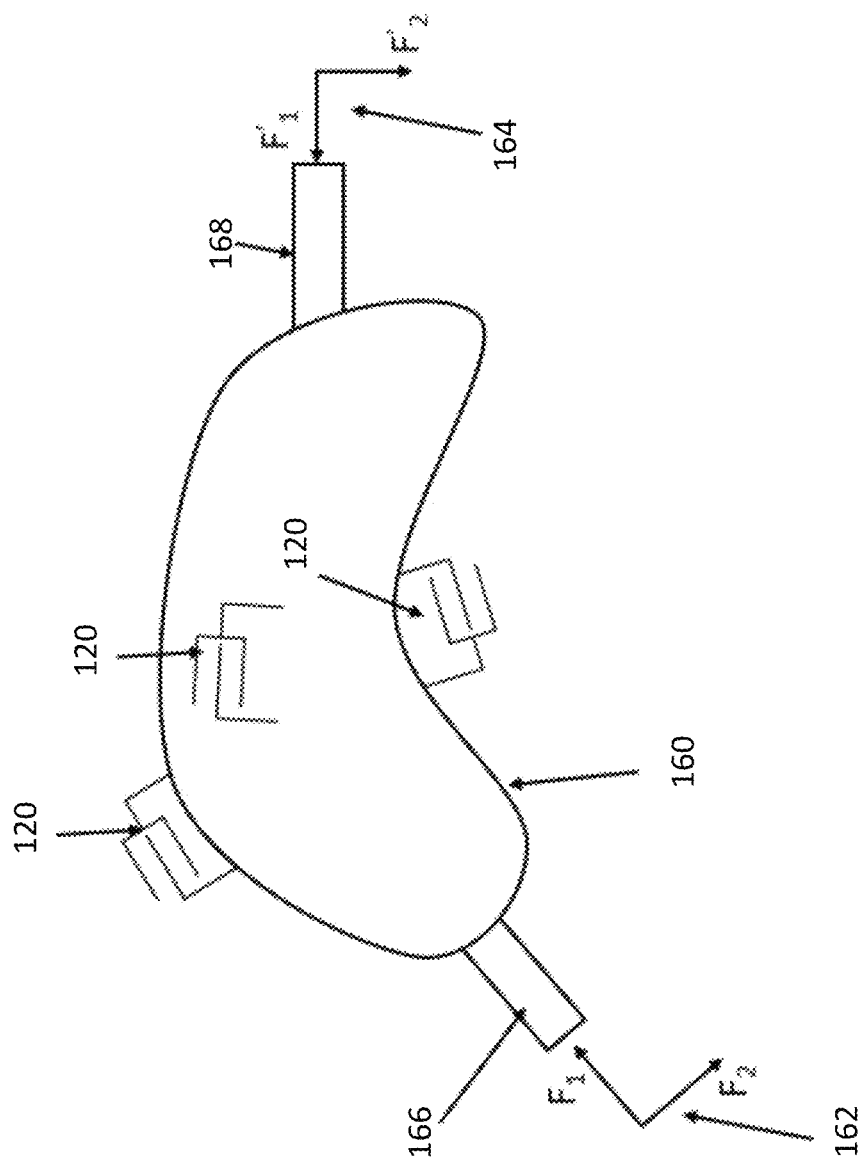
FIG. 12 is a schematic drawing illustrating a force sensor system having an alternative configuration of sensing modules.

Sensing modules 120 could be used in different configurations as shown in FIG. 12 to estimate the action forces 162 or reaction forces 164 applied at the actuation point 166 or the support point 168 of any component 160. For example, one or more sensors like sensor 10 may be attached to a structural member of a bridge, an architectural structure, a vehicle, an earthmoving machine, a robot, a tool, an instrument or the like to monitor deformation of the member as a result of applied forces.

Calibration

Figure 13:
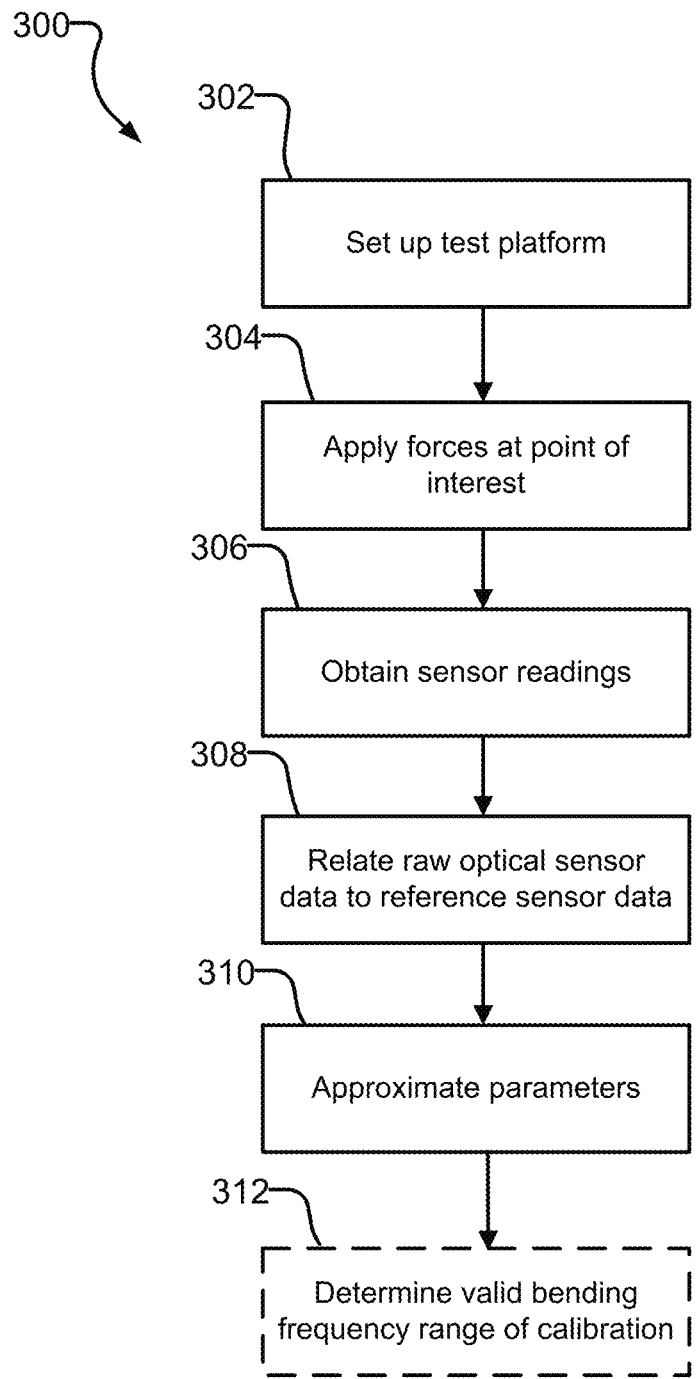
FIG. 13 is a block diagram showing an example method for calibrating an optical force sensor.

Force sensors as described herein may be calibrated. FIG. 13 is a flowchart showing a non-limiting example method 300 that may be performed to calibrate an optical force sensor.

At step 302, setup of the testing platform is performed. The testing platform may comprise a reference sensor that is pre-calibrated to accurately evaluate the forces of interest to be measured by the optical force sensor. Example reference sensors that may be used at step 302 include force sensors and strain gauges. The optical force sensor and the reference sensor are mounted onto appropriate locations of a member to which a test force is to be applied. For example, a reference force sensor could be mounted to the location of the applied force, and the optical force sensor could be mounted at a proximal end of the member that remains stationary. The optical force sensor may comprise two separate portions that are mounted to the member at spaced apart locations.

In some embodiments known forces are applied to a member, for example by using known weights or a spring having a known spring constant and compression or extension or the like. Where the applied forces are known the use of a reference force sensor is optional.

At step 304 test forces and/or moments are applied to a point on the member where a force measurement is desired. In some embodiments, the test forces applied to the member comprise a range of loading conditions. In some embodiments, the range of loading conditions is cyclic.

At step 306 (which may be concurrent with step 304), readings from the optical force sensor and the reference sensor are obtained. In some embodiments, the reference sensor produces a force measurement in suitable units (e.g. Newtons) over the time that the force is applied. The optical force sensor may produce measurements of the raw sensor data over time. In embodiments where the optical force sensor comprises a bi-cell photosensor, the raw sensor data may be a voltage proportional to the difference in the amount of light received at each of two photocells of the bi-cell. In some embodiments, offset voltage(s) may be applied which result in the raw sensor voltage being zero in the absence of a test force or when the test force has a specified magnitude.

At step 308, the raw optical sensor data is related to data from the reference sensor (or the magnitudes and directions of applied test forces which are known in some other manner). The relationship may be embodied in a function which may be recorded as values in a lookup table, parameters of an equation or the like. After the calibration the raw data may be applied as an input to the function to yield a force measurement as an output of the function. In some embodiments the function comprises an equation having a calibration term and an offset term, the sum of which provides a calibrated estimate of the test force measured at the reference sensor. In some embodiments, a calibration constant with units of N/V is applied to the optical sensor data at the calibration term.

In some embodiments, there is a delay between the time a force is applied to the member and the time that the optical sensor output reflects the applied force. This delay may, for example, be observable as a delay between the optical sensor output and the reference sensor output. To obtain accurate calibration the optical sensor outputs should be matched to the actual forces that yielded those outputs. In such a scenario, the optical sensor data may be offset by an offset value before it is matched with the reference sensor data and used for calibration. The offset value may be identified by maximizing a normalized cross-correlation between the two sensor readings. The offset value, may, for example comprise a number of samples. For example, where the reference force sensor and optical sensor are each sampled once every sample period the offset value may represent a number of sample periods between an optical sensor reading and the corresponding reference sensor reading to be used for calibration. In some embodiments, the offset term represents the DC offset between the two sensor readings. The calibration constant and the offset term are examples of "calibration coefficients"

At step 310, a solution to the equation of step 308 is derived by performing standard numerical curve fitting methods (e.g. least squares regression) using sensor readings obtained at step 306. Having obtained the calibration coefficients, the optical force sensor is calibrated.

Method 300 may proceed optionally to step 312 which determines the frequency range of the bending dynamics of the member over which the calibration is valid. The sensor bandwidth may be determined, for example by using frequency domain techniques such as tap testing, frequency sweeping or the like. As a specific example, The impulse response of the member may be captured to quantify its bending dynamics. From the impulse response, the frequency response can be determined and solved to obtain the natural frequency and the damping ratio of the member bending dynamics. A transfer function, and thus a bode plot, of the member bending from the applied force to the optical force sensor voltage outputs can be obtained to determine the bandwidth of sensor measurements over which the calibration of method 300 is valid.

Six Degree of Freedom Sensor Calibration

Method 300 discussed above is applicable to a one degree of freedom sensor arranged for determining an applied force in one axis. Sensing in additional degrees of freedom may be provided for by adding additional sensors (e.g. sensor 100 which has six sensors for six degree of freedom sensing). For a six degree of freedom sensor, the normalized readings $(X_1, X_2, \ldots X_6$ difference over sum) of the photosensor may be mapped to the force and moments applied to the sensor using the following equation:

$$\underbrace{\begin{Bmatrix} F_x \\ F_y \\ F_z \\ M_x \\ M_y \\ M_z \end{Bmatrix}}_{f} = \underbrace{\begin{bmatrix} a_{11} & a_{12} & a_{13} & \ldots & a_{16} \\ a_{21} & a_{22} & a_{23} & \ldots & a_{26} \\ \vdots & \vdots & \vdots & \ddots & \vdots \\ a_{61} & a_{62} & a_{63} & \ldots & a_{66} \end{bmatrix}}_{A} \underbrace{\begin{Bmatrix} X_1 \\ X_2 \\ X_3 \\ X_4 \\ X_5 \\ X_6 \end{Bmatrix}}_{x} \quad (1)$$

Where A is the calibration matrix, f is the force/moment vector and X is the photosensor normalized readings vector. The equation above can be re-written as below for every measurement point:

$$\underbrace{\begin{Bmatrix} F_x \\ F_y \\ F_z \\ M_x \\ M_y \\ M_z \end{Bmatrix}}_{f_{6\times 1}} = \underbrace{\begin{bmatrix} X_1 & X_2 & \ldots & X_6 & 0 & 0 & \ldots & 0 & 0 & \ldots & 0 & 0 \\ 0 & 0 & \ldots & 0 & X_1 & X_2 & \ldots & X_6 & 0 & \ldots & 0 & 0 \\ \vdots & \vdots & \vdots & \vdots & \vdots & \vdots & \vdots & \vdots & \vdots & \ddots & 0 & 0 \\ 0 & 0 & \ldots & 0 & 0 & 0 & \ldots & 0 & 0 & \ldots & X_5 & X_6 \end{bmatrix}}_{X_{6\times 36}} \underbrace{\begin{Bmatrix} a_{11} \\ a_{12} \\ a_{13} \\ \vdots \\ a_{65} \\ a_{66} \end{Bmatrix}}_{a_{36\times 1}} \quad (2)$$

Collecting sensor data for n sample points and assembling the data points in one matrix yields:

$$\begin{Bmatrix} (f_{6\times 1})_1 \\ (f_{6\times 1})_2 \\ (f_{6\times 1})_3 \\ \vdots \\ (f_{6\times 1})_n \\ f_{6n\times 1} \end{Bmatrix} = \begin{bmatrix} (X_{6\times 36})_1 \\ (X_{6\times 36})_2 \\ (X_{6\times 36})_3 \\ \vdots \\ (X_{6\times 36})_n \\ X_{6n\times 36} \end{bmatrix} \begin{Bmatrix} a_{11} \\ a_{12} \\ a_{13} \\ \vdots \\ a_{65} \\ a_{66} \\ a_{36\times 1} \end{Bmatrix} \quad (3)$$

The elements of the calibration matrix A may be determined by using the pseudo-inverse equation (4):

$$\alpha = (X^T X)^{-1} X^T f \quad (4)$$

There are certain advantages to having redundancy of single axis sensors in the measurement of forces and torques. For example, if instead of 6 elements, a sensor is constructed with 8 elements, keeping the same general arrangement as in FIG. 4, but providing 8 symmetrically arranged sensors, where four of the sensors have slits 116A and are interleaved with the other four of the sensors which have slits 116B then a six row eight column transformation matrix may be used to relate sensor values to forces and torques. The redundancy allows for simple fault detection and calibration checks by computing forces and torques in multiple ways by leaving one or more sensors out at a time and checking the results.

In some embodiments where one or more redundant sensors are provided, plural sets of calibration values (e.g. plural calibration matrices) are obtained for plural subsets of the sensors. As noted above, sensing forces and moments in N degrees of freedom requires at least N (appropriately arranged) sensors. For example, six sensors are required for sensing in 6 DOF. In a case where 8 sensors are provided there are 28 distinct ways to pick a subset which includes six of the eight sensors. Calibration matrices may be generated as described herein for some or all of these subsets. The forces and moments determined using different ones of the subsets of six sensors together with the corresponding calibration matrix may be compared (e.g. to generate a measure of reliability or confidence in the determined forces and moments) and/or combined (e.g. by determining a median, mean, average, weighted average of the forces and/or moments determined from the outputs of different subsets of the sensors).

An example method for calibrating a multi-DOF (e.g. 6 DOF) force sensor comprises:

Provide a sensing module mounted to the load carrying structure and carrying at least the same number of displacement sensors (according to any embodiment described herein) as there are degrees of freedom and arranging the displacement sensors so that at least one of the displacement sensors is sensitive to forces in each of the degrees of freedom.

Apply forces to the structure at a point of interest in each of the degrees of freedom and record the readings of the displacement sensors resulting from the application of each force. Preferably applying the forces comprises applying the forces in cycles (e.g. the applied forces are time varying forces F(t) where the time variation is periodic (e.g. F(t)=A sin(wt)+B where A+B is the maximum amplitude of the force, w is the frequency with which the force is applied and B is a constant component of the force. B could be zero.). In some embodiments the forces are applied in different increments (e.g. for each DOF a number of forces of different magnitudes may be applied in a desired sequence). This yields a (potentially large) set of known applied forces and measured sensor readings (collectively "calibration data").

Process the calibration data to calculate a calibration matrix.

Deploy the calibration matrix to sensor firmware or to software applied to process outputs of displacement sensors to yield force readings.

Example Application

A prototype system incorporating a sensor as described herein has been added to the instrument arm of a Robot-Assisted Minimally Invasive Surgery (RAMIS) robot. In this case the robot was a da Vinci EndoWrist® robot. Measurement of the lateral forces applied at the tip of RAMIS instruments are of interest for providing a surgeon with accurate force feedback, monitoring tissue damage, and developing training the expertise of surgeons, amongst other objectives. The assembly shown in FIG. 14 demonstrates an example use of the sensor systems described herein to estimate lateral forces applied at the instrument tip.

Figure 14:
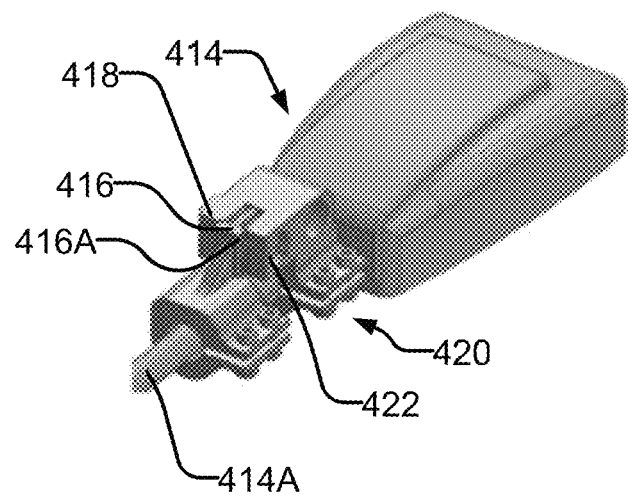
FIG. 14 shows an example use of an optical force sensor on a surgical instrument.
Figure 15:
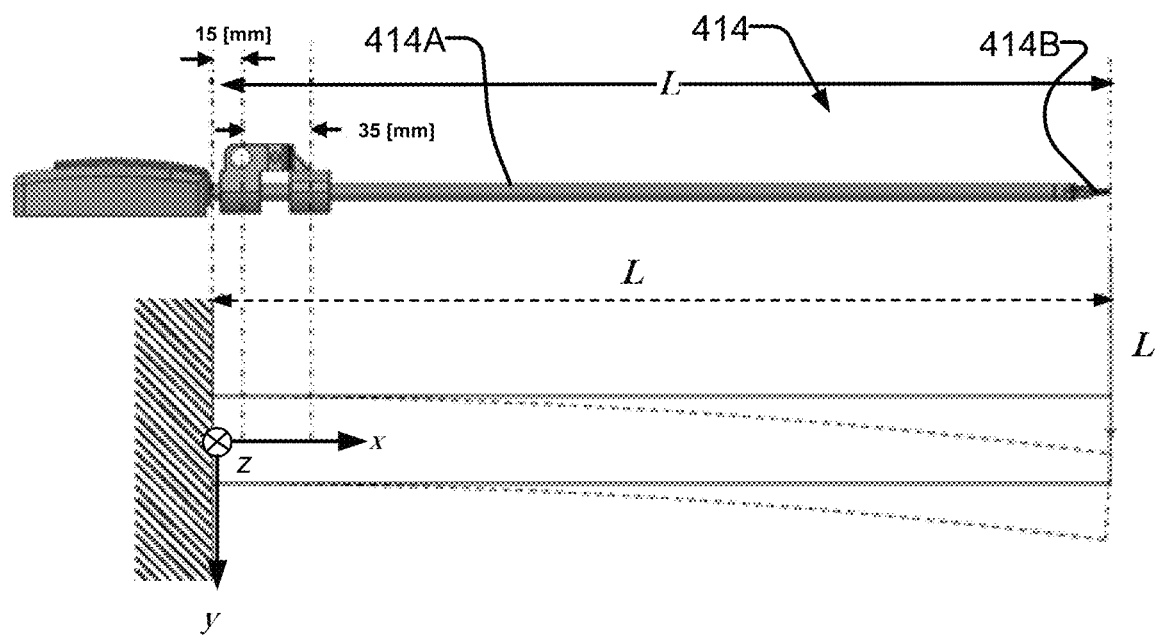
FIG. 15 shows the instrument of FIG. 14 modeled as a clamped flexible beam undergoing bending.

FIG. 14 shows optical force sensor 420 comprising Infrared (IR) LED 418 and a bi-cell photodiode 422 mounted onto an instrument shaft 414A. Force sensor 420 was provided near the base of instrument shaft 414A (see FIG. 15). In this case the distance from the base of instrument shaft 414A was 15 mm. A 2 mm thick aluminum plate 416 with a 1 mm wide slit 416A is mounted on instrument shaft 414A such that the IR light beam from LED 418 passes through slit 416A and impinges upon bi-cell 422. Deflection of instrument shaft 414A leads to a displacement of the slit 416A with respect to the LED-bi-cell pair and consequently changes the light received by each active element of bi-cell 422.

Figure 16:
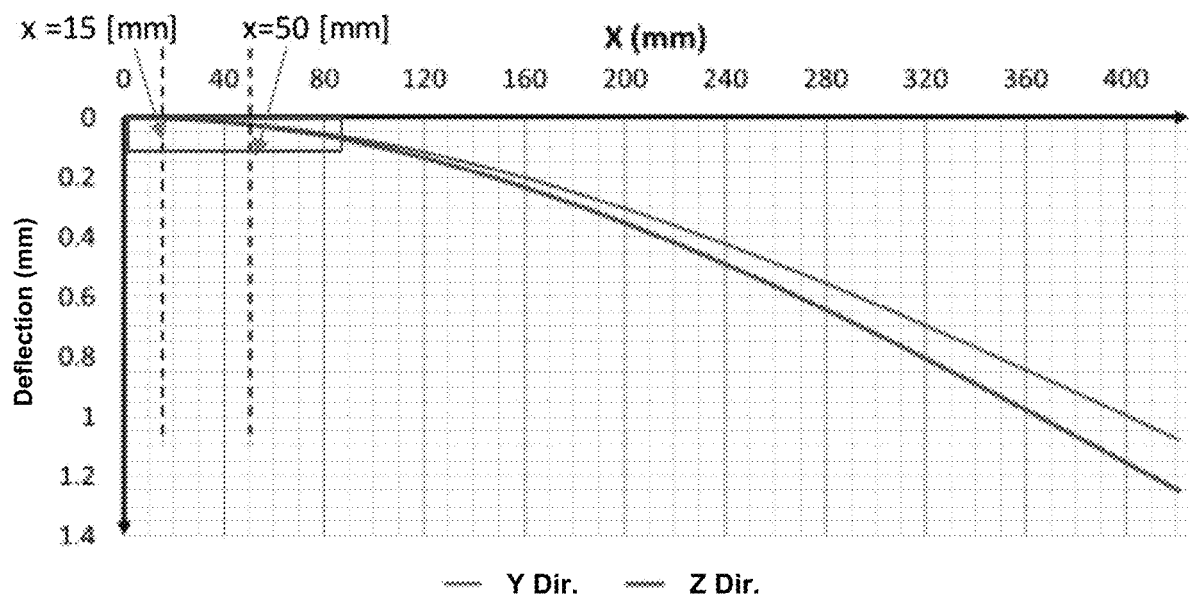
FIG. 16 is a graph depicting an example deflection profile of the instrument bending model in FIG. 15.

FIG. 16 depicts the strain along instrument shaft 414A when modeled as a clamped flexible beam. The holders for plate 416 and bi-cell 422 are mounted 35 mm apart. The bending behavior of instrument shaft 414A may be modeled by the following equation:

$$y = \frac{F}{EI_{zz}}\left(\frac{x^3}{3} + \frac{(L-x)x^2}{2}\right), 0 \leq x \leq L \quad (5)$$

where F is the lateral force applied at the instrument tip 414B, E=150 GPa is the Young's modulus for carbon fiber, L=420 mm is the length of the instrument, and $I_{zz}$=152.7 mm$^4$ is the moment of inertia of the composite cross-section of shaft 414A about its z-neutral axis. A similar bending profile in the y direction exists with $I_{yy}$=131.75 mm$^4$. FIG. 16 illustrates deflection profiles of shaft 414A in the lateral (y and z) directions for a 1N force applied at instrument tip 414B.

Figure 17:
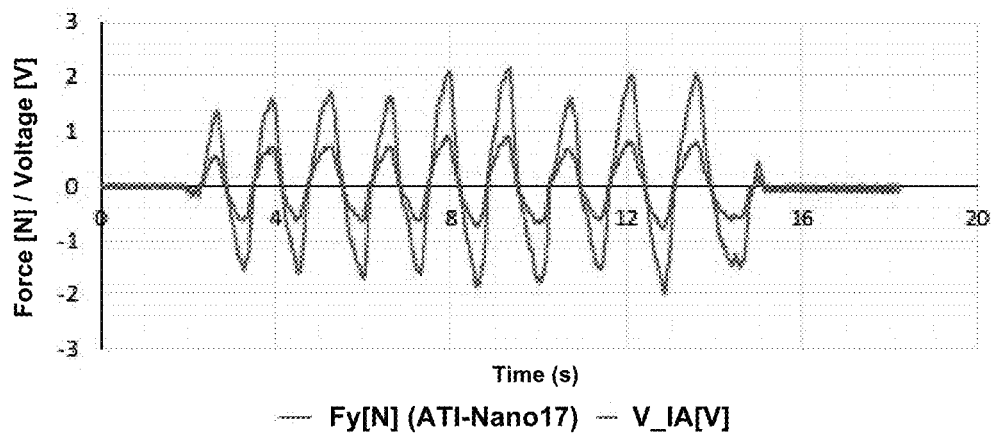
FIG. 17 is a graph depicting time-history calibration data for an optical force sensor and a reference force sensor where a cyclic force is applied.

Calibration of sensor 420 was performed according to method 300. At step 302, a six-axis reference force sensor (ATI Nano17™) is mounted at instrument tip 414B. At step 304, a cyclic force is applied in the y direction to the reference force sensor. FIG. 17 is a plot showing time-history calibration data for sensor data obtained at step 306. The bi-cell sensor output is represented as a voltage ($V_{IA}$) and the reference force sensor readings are represented as a force ($F_{ATI_y}$). The calibration was performed with the gain of the instrumentation amplifier set to 133, which resulted in a peak voltage of ~2 V in response to a corresponding relative displacement of slit 416A with respect to bi-cell 422 when a lateral force of ~0.8 N was applied at instrument tip 414B.

Figure 18:
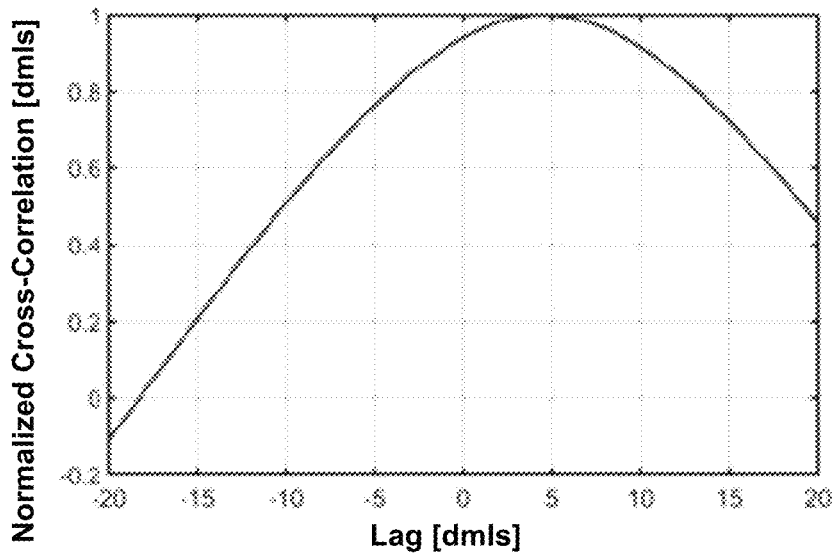
FIG. 18 is a graph depicting normalized cross correlation between an optical force sensor and a reference force sensor to account for delays in sensor output.

The following calibration equation was used for relating raw data from sensor 420 to force data obtained from the reference force sensor at step 308:

$$F_{ATI}(k) = a_0 V_{IA}(k-a_1) + a_2 \quad (6)$$

where $F_{ATI}(k)$ is the lateral force applied at the reference force sensor at a measurement index k. $a_0$ is the calibration constant (expressed in units of N/V), $a_1$ is the offset of the optical sensor measurement index to correct for delays between the optical sensor output and the reference sensor output, and $a_2$ is the DC offset between the two sensor readings (expressed in units of N). $a_1$ was determined by maximizing the normalized cross-correlation between the readings of sensor 420 and the readings of the reference sensor. As shown in FIG. 18, the cross-correlation had a maximum for lag of 5 samples between the two sensor readings ($a_1$=5).

At step 310, $a_0$ and $a_2$ were approximated by reformulating calibration equation (6) in matrix form (7) and using the least squares technique (8):

$$F_{ATI}(k) = [V(k-a_1)1]w, \text{ where } w = \begin{bmatrix} a_0 \\ a_2 \end{bmatrix} \quad (7)$$

$$w = \underset{w}{\text{argmin}} \|F_{ATI} - Xw\|_2^2 = (X^TX)^{-1}X^TF_{ATI} \quad (8)$$

Figure 19:
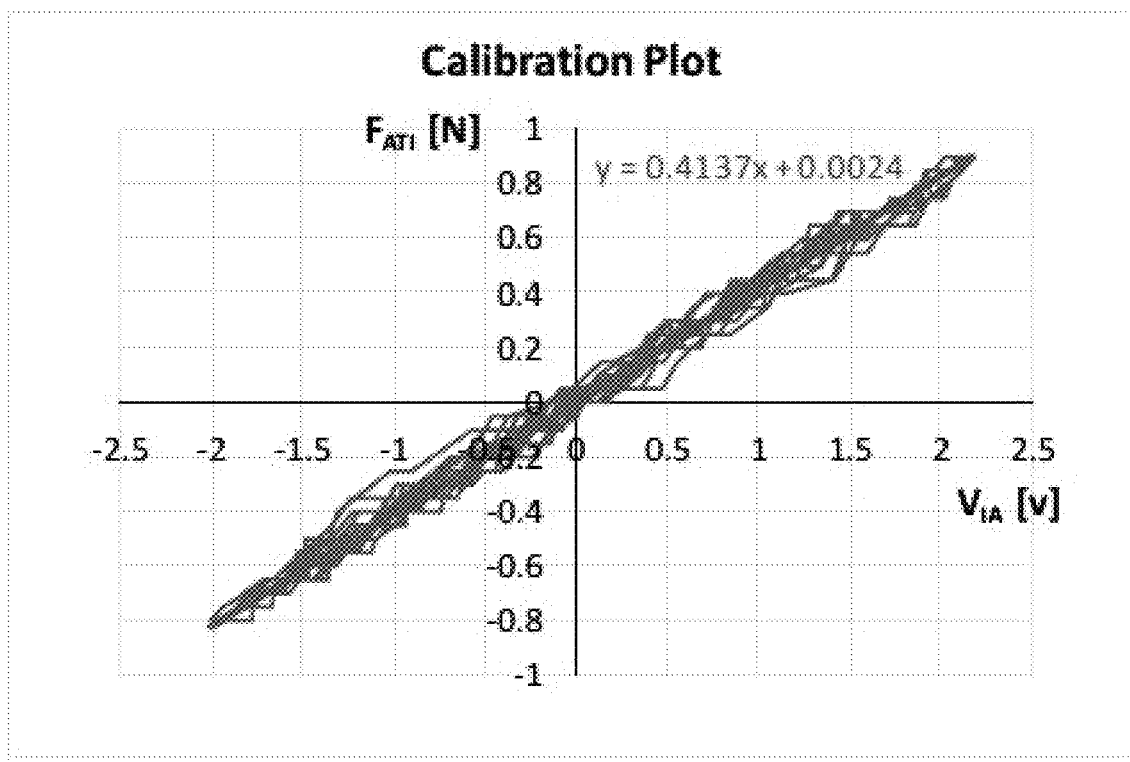
FIG. 19 is a graph depicting optical force sensor calibration using least squares regression.

FIG. 19 shows the calibration plot obtained from solving for w by performing a least squares regression according to equation (8). As shown, $a_0$=0.4137 N/V and $a_2$=0.0024 N. As the FIG. 19 plot shows, the response of sensor 420 to force was linear with no observed hysteresis.

To determine a valid frequency range for the calibration at step 312, the impulse response of instrument 414 was captured. FIG. 20 shows that the damped frequency $F_d = F_n\sqrt{1-\zeta^2}$=24 Hz, where $F_n$ is the natural frequency and $\zeta$ is the damping ratio of the instrument bending dynamics. The power constant of the exponential fit to the impulse response peaks is equal to $-2\pi\zeta F_n$. Considering the average of power constants of the exponential term in the positive and negative fits, $-2\pi\zeta F_n$=-4.83. Solving the above two equations results in the following:

$$\zeta = 0.032, F_n = 24.012 \text{ Hz} \quad (9)$$

The transfer function of the instrument shaft 414A bending from the applied force at the instrument tip ($F_y$) to the output voltage ($V_{IA}$) of sensor 420 can be represented as a single degree of freedom system given by:

$$\frac{V_{IA}}{F_y} = \frac{a_3}{s^2 + 2\zeta\omega_n s + \omega_n^2} \quad (10)$$

where:

$$\omega_n = 2\pi F_n; \text{ and}$$

$$\frac{a_3}{\omega_n^2} = \frac{1}{a_0},$$

$a_0$ previously identified as 0.4137 N/V
Hence, $$a_3 = 5502.3 \frac{V}{Ns^2}.$$

Figure 21:
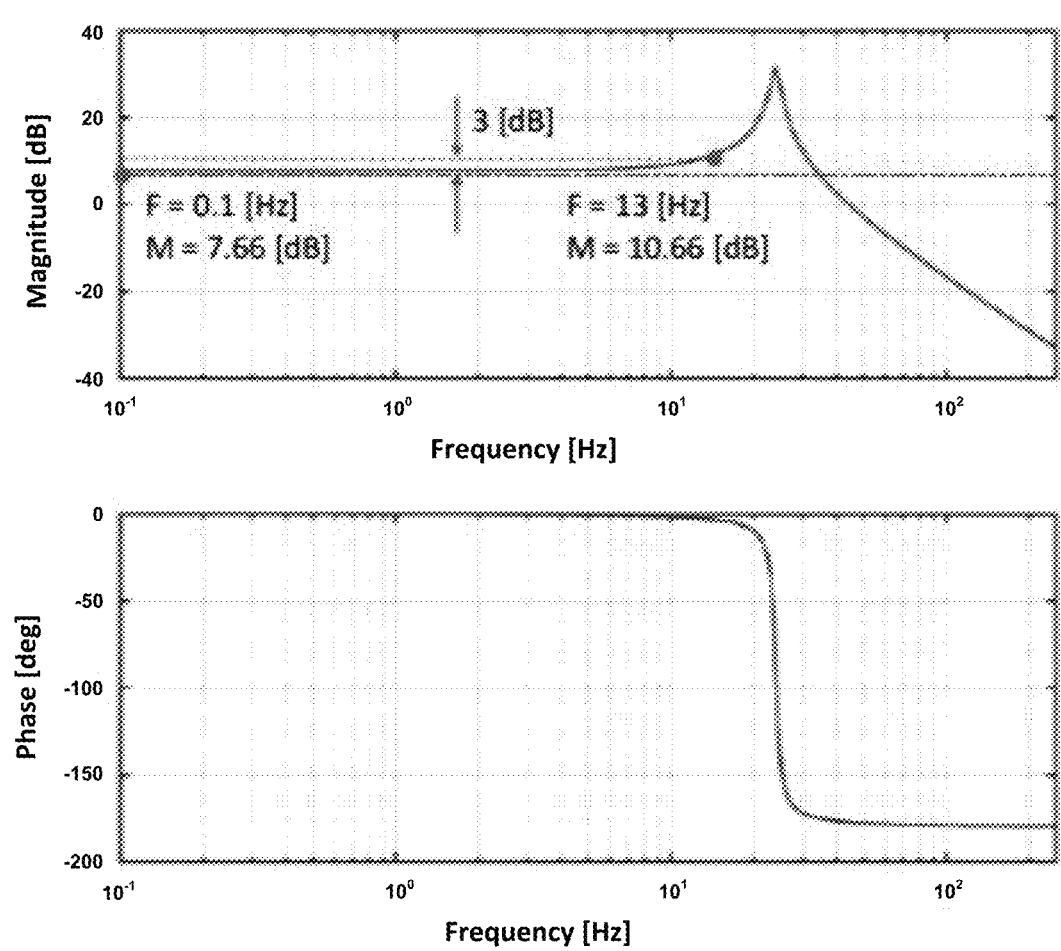
FIG. 21 is a Bode plot of instrument shaft bending dynamics.

The Bode plot of the instrument bending dynamics represented by equation (10) is shown in FIG. 21. The bandwidth of the sensor measurements over which the calibration above is valid is shown to be ~13 Hz.

The principles illustrated by the prototype embodiment above may be applied to make and calibrate multi-axis force sensors for use in a wide range of applications.

Interpretation of Terms

Unless the context clearly requires otherwise, throughout the description and the
- "comprise", "comprising", and the like are to be construed in an inclusive sense, as opposed to an exclusive or exhaustive sense; that is to say, in the sense of "including, but not limited to";
- "connected", "coupled", or any variant thereof, means any connection or coupling, either direct or indirect, between two or more elements; the coupling or connection between the elements can be physical, logical, or a combination thereof;
- "herein", "above", "below", and words of similar import, when used to describe this specification, shall refer to this specification as a whole, and not to any particular portions of this specification;
- "or", in reference to a list of two or more items, covers all of the following interpretations of the word: any of the items in the list, all of the items in the list, and any combination of the items in the list;
- the singular forms "a", "an", and "the" also include the meaning of any appropriate plural forms.

Words that indicate directions such as "vertical", "transverse", "horizontal", "upward", "downward", "forward", "backward", "inward", "outward", "left", "right", "front", "back", "top", "bottom", "below", "above", "under", and the like, used in this description and any accompanying claims (where present), depend on the specific orientation of the apparatus described and illustrated. The subject matter described herein may assume various alternative orientations. Accordingly, these directional terms are not strictly defined and should not be interpreted narrowly.

Where a component (e.g. a LED, amplifier, filter, photosensor, photodiode, processor, assembly, device, shaft, circuit, etc.) is referred to above, unless otherwise indicated, reference to that component (including a reference to a "means") should be interpreted as including as equivalents of that component any component which performs the function of the described component (i.e., that is functionally equivalent), including components which are not structurally equivalent to the disclosed structure which performs the function in the illustrated exemplary embodiments of the invention.

Specific examples of systems, methods and apparatus have been described herein for purposes of illustration. These are only examples. The technology provided herein can be applied to systems other than the example systems described above. Many alterations, modifications, additions, omissions, and permutations are possible within the practice of this invention. This invention includes variations on described embodiments that would be apparent to the skilled addressee, including variations obtained by: replacing features, elements and/or acts with equivalent features, elements and/or acts; mixing and matching of features, elements and/or acts from different embodiments; combining features, elements and/or acts from embodiments as described herein with features, elements and/or acts of other technology; and/or omitting combining features, elements and/or acts from described embodiments.

Various features are described herein as being present in "some embodiments". Such features are not mandatory and may not be present in all embodiments. Embodiments of the invention may include zero, any one or any combination of two or more of such features. This is limited only to the extent that certain ones of such features are incompatible with other ones of such features in the sense that it would be impossible for a person of ordinary skill in the art to construct a practical embodiment that combines such incompatible features. Consequently, the description that "some embodiments" possess feature A and "some embodiments" possess feature B should be interpreted as an express indication that the inventors also contemplate embodiments which combine features A and B (unless the description states otherwise or features A and B are fundamentally incompatible).

It is therefore intended that the following appended claims and claims hereafter introduced are interpreted to include all such modifications, permutations, additions, omissions, and sub-combinations as may reasonably be inferred. The scope of the claims should not be limited by the preferred embodiments set forth in the examples, but should be given the broadest interpretation consistent with the description as a whole.

The invention claimed is:

1. An apparatus for measuring forces and torque on a load-carrying element, the apparatus comprising:
a plurality of optical sensors mounted to the load-carrying element, each of the optical sensors comprising a light source, a photosensor and an opaque mask positioned in a light path between the light source and the photosensor, the photosensor comprising first and second light sensitive elements separated by a boundary and the mask having a window that is movable relative to the photosensor and located such that light from the light source that passes through the window forms an illuminated region on the photosensor, the illuminated region including at least part of the boundary and parts of each of the first and second light sensitive elements;
wherein, for each of the plurality of optical sensors:
the light source and the photosensor are mounted to a first part and the first part is coupled to the load-carrying element at a first location and a second part of the optical sensor comprising the mask is attached to the load-carrying element at a second location spaced apart from the first location; and
a part of the load-carrying element extending between the first location and the second location undergoes deformations as a result of the forces; and
wherein the boundaries between the first and second light sensitive elements of the photosensors of different ones of the optical sensors are oriented in different directions relative to an axis of the load-carrying element.

2. The apparatus according to claim 1 wherein the light sensitive elements comprise photodiodes.

3. The apparatus according to claim 1 wherein the optical sensors are arranged in a ring extending around the load-carrying element.

4. The apparatus according to claim 1 wherein for a first group of the optical sensors the boundary between the first and second light sensitive elements of the photosensor is oriented generally parallel to the axis of the load-carrying element and for a second group of the optical sensors the boundary between the first and second light sensitive elements of the photosensor is oriented generally transverse to the axis of the load-carrying element.

5. The apparatus according to claim 1 wherein for a first group of the optical sensors the boundary between the first and second light sensitive elements of the photosensor is oriented in a first direction relative to the axis of the load-carrying element and for a second group of the optical sensors the boundary between the first and second light sensitive elements of the photosensor is oriented in a second direction relative to the axis of the load-carrying element and wherein the first and second directions are mutually perpendicular.

6. The apparatus according to claim 1 wherein, for each of the optical sensors, one of the first and second parts of the optical sensor is mounted to a first carrying member that is attached to the load-carrying element and the other one of the first and second parts of the optical sensor is mounted to a second carrying member that is attached to the load-carrying element.

7. The apparatus according to claim 6 wherein the first carrying member comprises a ring that extends around the load-carrying element.

8. The apparatus according to claim 1 wherein one or more of the optical sensors comprises a mechanical adjustment operable to move the first part of the optical sensor relative to the second part of the sensor in a direction that is transverse to the boundary.

9. The apparatus according to claim 1 wherein one or more of the optical sensors comprises a mechanical adjustment operable to move the first part of the optical sensor relative to the second part of the sensor in a direction that is parallel to a longitudinal axis of the load-carrying element.

10. The apparatus according to claim 1 comprising electronic circuits connected to receive, amplify and send to a processor output signals from the plurality of optical sensors.

11. The apparatus according to claim 10 wherein the electronic circuits comprise an offset circuit connected to drive an offset current through one of the first and second light sensitive elements, the offset current adding to or subtracting from a current passing through the light sensitive element.

12. The apparatus according to claim 1 wherein the apparatus comprises a processor connected to process outputs from the optical sensors to yield forces applied to the load-carrying element.

13. The apparatus according to claim 1 wherein the window is dimensioned so that the illuminated region completely covers the boundary between the first and second light sensitive elements.

14. The apparatus according to claim 1 wherein the window is shaped and dimensioned so that the illuminated region covers a portion of the boundary between the first and second light sensitive elements and portions of a boundary of the illuminated region that cross the boundary between the first and second light sensitive elements are straight line segments oriented perpendicular to the boundary between the first and second light sensitive elements.

15. The apparatus according to claim 1 wherein the first and second light sensitive elements of the photosensor of one or more of the optical sensors are each divided into two parts by a second boundary that intersects the boundary.

16. The apparatus according to claim 15 wherein the window is dimensioned so that the illuminated region covers a portion of the boundary between the first and second light sensitive elements and a portion of the second boundary.

17. The apparatus according to claim 16 wherein the window is shaped such that portions of a boundary of the illuminated region that cross the boundary between the first and second light sensitive elements are straight line segments oriented perpendicular to the boundary between the first and second light sensitive elements and portions of the boundary of the illuminated region that cross the second boundary are straight line segments oriented perpendicular to the second boundary.

18. A method for measuring forces and torque on a load-carrying element, the method comprising:
providing a plurality of optical sensors mounted to the load-carrying element, each of the optical sensors comprising a light source, a photosensor and an opaque mask positioned in a light path between the light source and the photosensor, the photosensor comprising first and second light sensitive elements separated by a boundary and the mask having a window located such that light from the light source that passes through the window forms an illuminated region on the photosensor, the illuminated region including at least part of the boundary and parts of each of the first and second light sensitive elements;
wherein, for each of the plurality of optical sensors:
the light source and the photosensor are mounted to a first part and the first part is coupled to the load-carrying element at a first location and a second part of the optical sensor comprising the mask is attached to the load-carrying element at a second location spaced apart from the first location; and
a part of the load-carrying element extending between the first location and the second location undergoes deformations as a result of the forces; and
wherein the boundaries between the first and second light sensitive elements of the photosensors of different ones of the optical sensors are oriented in different directions relative to an axis of the load-carrying element; and
the method comprises processing output signals from the light sensitive elements of the plurality of optical sensors to determine measurements of the forces applied to the load-carrying element in at least two directions and at least one moment applied to the load-carrying element.

19. An apparatus for measuring forces on a shaft, the apparatus comprising:
first and second attachments rigidly attachable to the shaft at first and second longitudinal positions along the shaft, the second longitudinal position spaced apart from the first longitudinal position;
an optical sensor comprising a light source, a photosensor and an opaque mask positioned in a light path between the light source and the photosensor, the photosensor comprising first and second light sensitive elements separated by a boundary and the mask having a window located such that light from the light source that passes through the window forms an illuminated region on the photosensor, the illuminated region including at least part of the boundary and parts of each of the first and second light sensitive elements; and
wherein the light source and photosensor are attached to the first attachment at locations spaced apart from the shaft and the mask is attached to the second attachment at a location spaced apart from the shaft.

20. The apparatus according to claim 19 wherein the first and second attachments respectively comprise a first collar having a bore shaped and dimensioned to receive the shaft and a second collar having a bore shaped and dimensioned to receive the shaft and the apparatus comprises a first clamp configured to clamp the first collar against the shaft to thereby hold the first collar rigid to the shaft at the first longitudinal position along the shaft and a second clamp configured to clamp the second collar against the shaft to thereby hold the second collar rigid to the shaft at the second longitudinal position along the shaft.

* * * * *